US006372843B1

United States Patent
Barruel et al.

(10) Patent No.: US 6,372,843 B1
(45) Date of Patent: Apr. 16, 2002

(54) METHOD FOR PREPARING POLYORGANOSILOXANES (POS) WITH THIOL FUNCTIONS, POS OBTAINABLE BY THIS METHOD AND THEIR USE PARTICULARLY IN RUBBER MATERIALS

(75) Inventors: Pierre Barruel, Tassin la Demi-Lune; Yves Bomal, Paris; Nathalie Guennouni, Irigny; Gerard Mignani, Lyons; Christian Priou, Villeurbanne, all of (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/462,565

(22) PCT Filed: Jul. 10, 1998

(86) PCT No.: PCT/FR98/01506

§ 371 Date: Apr. 19, 2000

§ 102(e) Date: Apr. 19, 2000

(87) PCT Pub. No.: WO99/02580

PCT Pub. Date: Jan. 21, 1999

(30) Foreign Application Priority Data

Jul. 11, 1997 (FR) .............................. 97 09116
Feb. 4, 1998 (FR) .............................. 98 01513

(51) Int. Cl.[7] .............................. C08L 83/08
(52) U.S. Cl. .............................. 524/588; 528/30; 528/32; 556/427; 556/458; 556/482; 525/474; 524/437; 524/492; 524/543; 524/544; 524/556; 524/565; 523/213
(58) Field of Search .............................. 528/32, 30; 556/427, 556/458, 482; 525/474; 524/588, 437, 492, 543, 544, 56, 565; 523/213

(56) References Cited

U.S. PATENT DOCUMENTS 2,960,492 A   11/1960  Maurice
4,082,790 A    4/1978  Speier
5,366,772 A *  11/1994  Badesha et al.

FOREIGN PATENT DOCUMENTS

DD   299 187     4/1992
FR   2 094 859   2/1972
WO   96 16125    3/1996
WO   96 16126    3/1996

* cited by examiner

*Primary Examiner*—Margaret G. Moore
*Assistant Examiner*—Kuo-Liang Peng
(74) *Attorney, Agent, or Firm*—Burns, Doane, Swecker & Mathis, L.L.P.

(57) ABSTRACT

The present invention relates to a process for preparing multifunctionalized polyorganosiloxanes (POSs) comprising alkoxyl functional siloxyl units and siloxyl units each having an SH functional group, which consists in introducing the SH functional group by the reaction of $H_2S$ on a precursor POS of formula: $A\text{—}(RXSiO)_a\text{—}(RYSiO)_b\text{—}B$ where R is especially a $C_1$–$C_6$ alkyl radical, X is a $C_1$–$C_{15}$ alkoxyl radical, Y is a $C_2$–$C_{30}$ hydrocarbon group which includes an ethylenically unsaturated group from which the SH functionality derives, a is a number ranging from 1 to 150, b is a number ranging from 1 to 150, the number a+b ranging from 2 to 300 and A and B are terminal groups which are selected respectively, from, in particular, on the one hand $(R)_3SiO\text{—}$ radicals taken alone or as mixtures with $(R)_2XSiO\text{—}$ and/or $R(X)_2SiO\text{—}$ and/or $(X)_3SiO\text{—}$ radicals and on the other hand $\text{—}Si(R)_3$ radicals taken alone or as mixtures with $\text{—}SiX(R)_2$ and/or $\text{—}Si(X)_2R$ and/or $\text{—}Si(X)_3$ radicals.

22 Claims, 1 Drawing Sheet

METHOD FOR PREPARING POLYORGANOSILOXANES (POS) WITH THIOL FUNCTIONS, POS OBTAINABLE BY THIS METHOD AND THEIR USE PARTICULARLY IN RUBBER MATERIALS

A first subject of the invention is that of the functionalization of silicones, in particular of linear polyorganosiloxanes (or POSs for short).

The functionalized POSs which are more specifically of interest in the context of the invention are multifunctionalized linear polyorganosiloxanes comprising alkoxyl polar functional groups and functional groups each having a thiol group SH.

These functional groups give the POSs specific properties which allow them to be used, for instance, and as form other subjects of the invention, as an anti-blocking modulator in silicone compositions or as a coating agent for a white filler, especially a siliceous filler, for the purpose of aiding the processing of the filler in filled silicone compositions and of allowing the silicone products obtained to be reinforced. These polyfunctionalized POSs can also be used as a white-filler/elastomer coupling agent in compositions of rubber(s) comprising a white filler, especially a siliceous substance, as a reinforcing filler.

The principle of POS multifunctionalization is described in document WO-A-96/16125 in the name of the Applicant. This document discloses, for example, the preparation of POSs comprising ≡Si—(O-alkyl) functional units and ≡Si-(chain having a sulphur-containing group, especially SH) functional units. The —(O-alkyl) functional group is introduced into an appropriate polyhydrogenoorganosiloxane by a dehydrogenocondensation reaction using alcohol from which the —(O-alkyl) functional group is derived (in this step, a fraction of the initial ≡SiH groups is substituted by alkoxyl functional groups) and then the -(chain having a sulphur-containing group, especially SH) functional unit is introduced by hydrosilylation of an olefin carrying the sulphur-containing group by the remaining ≡SiH groups.

Continuing work in this technical field, the Applicant has now discovered, and it is this which constitutes the first object of the invention, that it is possible to provide functional groups containing an SH group by making hydrogen sulphide react on a precursor multifunctionalized POS containing a specific reactive group which, in the presence of a catalyst, leads to an SH group; the group in question is an ethylenically unsaturated group located at the end of the chain or in the chain connected to a silicon atom.

Many documents exist in the prior art which describe the functionalization of ethylenically Unsaturated organic compounds by H$_2$S; however, to the knowledge of the Applicant, it has never been a question, hence the novelty of the present invention, of the said reactions using appropriate functionalized POSs as raw material.

Figure 1:
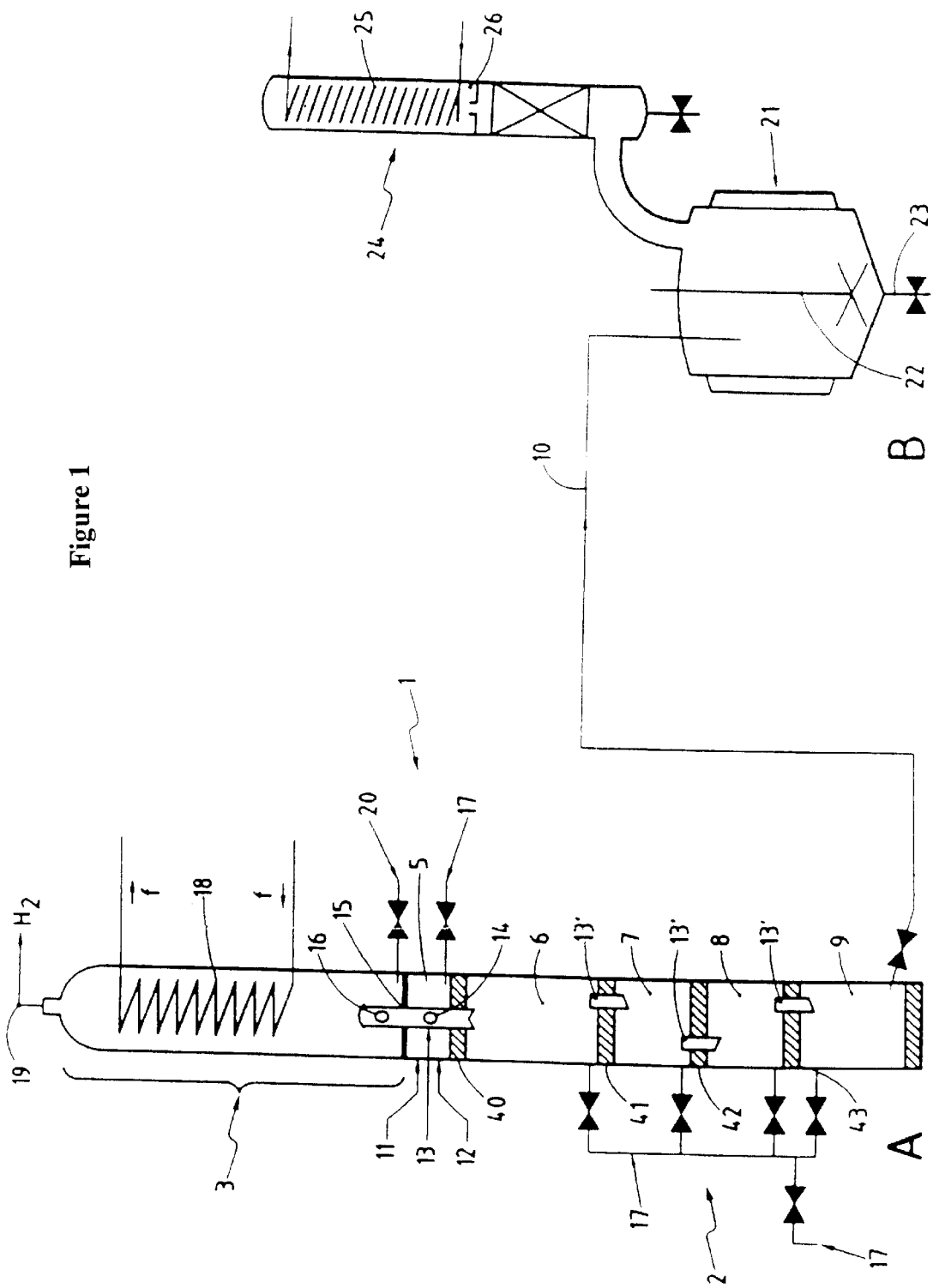
FIG. 1 illustrates an apparatus for carrying out the (semi) continuous process of the invention comprising a continuous dehydrogenocondensation reactor A and a batch hydrosilyation reactor B.

The present invention, in the context of a first subject, therefore relates to a process for preparing multifunctionalized POSs comprising alkoxyl polar functional groups and functional groups each having a thiol group SH, which are random, sequentially-polymerized or block linear copolymers of the following average formula:

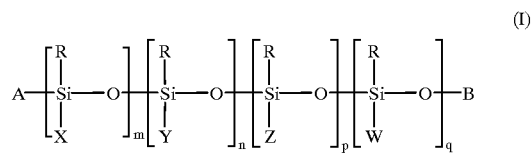

(I)

in which:
the symbols R, which are identical or different, each represent a linear or branched alkyl radical having from 1 to 6 carbon atoms or a phenyl radical;
the symbols X, which are identical or different, each represent a linear or branched alkoxyl radical having from 1 to 15 carbon atoms; the symbols Y, which are identical or different, each represent a chain R' which includes an ethylenically unsaturated group, the said chain being linked to the silicon atom by an Si—C bond where:
the chain R' has from 2 to 30 carbon atoms and, optionally, one or more oxygenated heteroatoms,
the ethylenically unsaturated group of R' is:
either present as a chain termination and of the type:

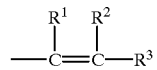

where the symbols R$^1$, R$^2$ and R$^3$, which are identical or different, each represent a hydrogen atom or a linear or branched alkyl radical having from 1 to 3 carbon atoms,
or present in an intermediate position and of the type:

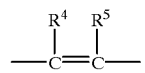

where the symbols R$^4$, R$^5$, which are identical or different, each represent a hydrogen atom or a linear or branched alkyl radical having from 1 to 3 carbon atoms, it being possible for the said intermediate position to be on a cyclic or polycyclic part of the chain R' consisting of one or more rings having from 5 to 12 members;
the symbols Z, which are identical or different, each represent a chain R" linked to an SH group, the said chain being attached to the silicon atom by an Si—C bond, where:
the chain R" derives from the above-defined chain R' by the addition of a hydrogen atom and of an SH group respectively on one or other of the carbon atoms of the ethylenically unsaturated group which are linked to each other by a double bond, the SH group is:
either present as a chain termination or of the following type (or types):

(1)

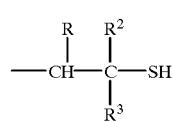

and/or (2)

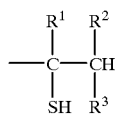

where the symbols $R^1$, $R^2$ and $R^3$ are as defined above, or present in an intermediate position and of the following type (or types):

(3)

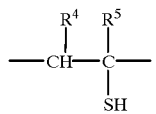 and/or (4)

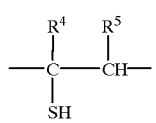

where the symbols $R^4$ and $R^5$ are as identical or different, each represent a defined above, it being possible for the said intermediate position to be on a cyclic or polycyclic part of the chain consisting of one or more rings having from 5 to 12 members;

the symbols W, which are identical or different, each represent a sequence $-R''-(S)_i-R''-Si\equiv$ where:
  i is an integer $\geq 1$, preferably equal to 1 or 2,
  the symbol on the right, $Si\equiv$, represents a silicon atom belonging to another polyorganosiloxane chain or to the same polyorganosiloxane chain;

the symbols m, n, p and q each represent integers or fractions, with the additional conditions in which:
  the sum m+n+p+q lies within the range 2 to 300, preferably 10 to 100 and even more preferably 10 to 70,
  m lies within the range 1 to 150, preferably 1 to 50 and even more preferably 1 to 40,
  the sum n+p+q lies within the range 1 to 150, preferably 1 to 50 and even more preferably 1 to 30,
  n lies within the range 0 to 85, preferably 0 to 30 and even more preferably 0 to 20,
  p lies within the range 1 to 100, preferably 1 to 40 and even more preferably 1 to 25,
  q lies within the range 0 to 25, preferably 0 to 5 and even more preferably 0 to 3;

the symbols A and B represent terminal groups which comprise:
  with respect to A: either radicals (i), (2i) or (3i) taken alone, or mixtures of radicals (i) with radicals (2i) and/or (3i) and/or (4i):

(i)

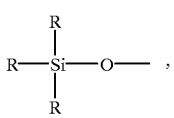

(2i)

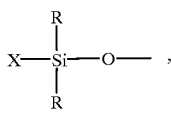

(3i)

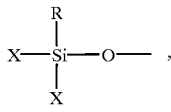

(4i)

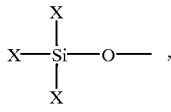

with respect to B: either radicals (5i), (6i) or (7i) taken alone, or mixtures of radicals (5i) with radicals (6i) and/or (7i) and/or (8i):

(5i)

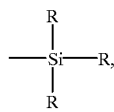

(6i)

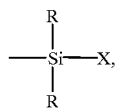

(7i)

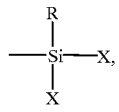

(8i)

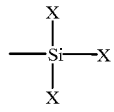

where the symbols R and X are as defined above; the said process for preparing the POSs of formula (I) being characterized in that it consists in making hydrogen sulphide react on a random, sequentially-polymerized or block linear copolymer, of average formula:

(II)

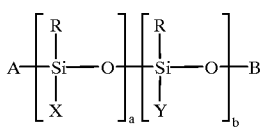

in which:
  the symbols A, B, R, X and Y are defined as above with regard to formula (I);
  the symbols a and b each represent integers or fractions and can be defined as follows:
    a meets the same definition as that of m given above with regard to formula (I),
    b=n+p+q; n, p and q and their sum satisfying the definitions given above with regard to formula (I), the sum a+b meeting the same definition as that of the sum m+n+p+q given above with regard to formula (I);

the reaction of $H_2S$ on the POS (II) being carried out in the presence of a catalyst based on one or more free-radical initiator compounds at a temperature lying within the range from ambient temperature (23° C.) to 150° C.

The expression "linear copolymers", of formulae (I) and (II), should be understood to mean POSs having, in the chain, no more than 3% of units other than the $RXSiO_{2/2}$, $RYSiO_{2/2}$, $RZSiO_{2/2}$ and $RWSiO_{2/2}$ units and the units constituting terminal groups A and B, such as, for example, units of formula $RSiO_{3/2}$ (T) and/or $SiO_{4/2}$ (Q), the % values indicated expressing the number of T and/or Q units per 100 silicon atoms.

Preferably, the symbols R in the formulae (I) and (II) represent the radicals: methyl, ethyl, n-propyl, isopropyl, n-butyl; more preferably, at least 80 mol % of the radicals R are methyls.

Preferably, the symbols X in the formulae (I) and (II) represent linear or branched alkoxyl radicals having from 1 to 6 carbon atoms; the methoxyl, ethoxyl and (iso)propoxyl radicals are more preferably adopted.

Preferably, the symbols A and B in the formulae (I) and (II) represent, respectively, on the one hand either radicals (i), (2i) or (3i) taken alone or mixtures formed from radicals (i)+[(2i) and/or (3i) and/or (4i)] and on the other hand either radicals (5i), (6i) or (7i) taken alone or mixtures formed from radicals (5i)+[(6i) and/or (7i) and/or (8i)], where the symbols R and X correspond to the preferred types defined above.

More preferably, the symbols A and B in the formulae (I) and (II) represent mixtures formed, respectively, from the radicals (i)+[(2i) and/or (3i) and/or (4i)] and from the radicals (5i)+[(6i) and/or (7i) and/or (8i)], where the symbols R and X correspond to the preferred or more preferred types defined above.

Preferably, the symbols Y in the formulae I and II are selected from the following list:

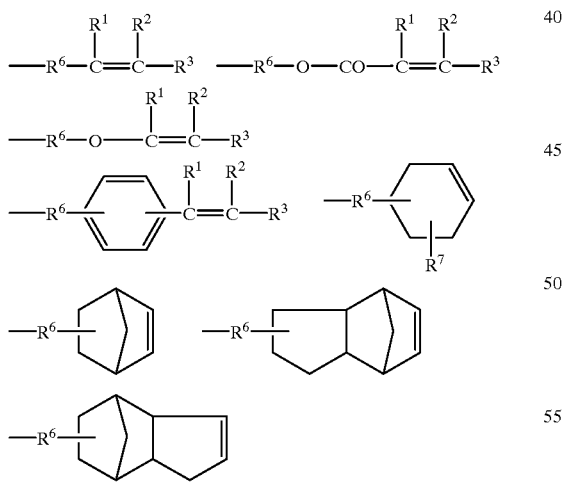

where:
$R^1$, $R^2$ and $R^3$, which are identical or different, each represent a hydrogen atom or a methyl radical;
$R^6$ represents a divalent radical $—(CHR^8)_j—$, with $R^8$ being a hydrogen atom or a methyl group, it being possible for the various $CHR^8$ units to be identical or different, and with j being an integer ranging from 1 to 6;

$R^7$ represents a hydrogen atom or a methyl radical.

The symbols Y more preferably adopted are selected from the following list:

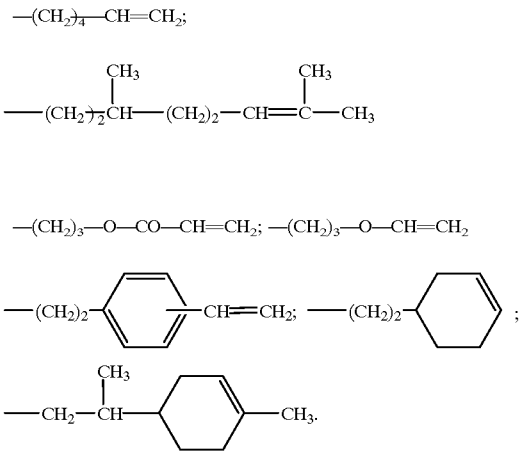

The reader will understand that, in the POSs of formula (I), the symbols Z, which derive from the more preferably adopted symbols Y for example, are selected from the following list:

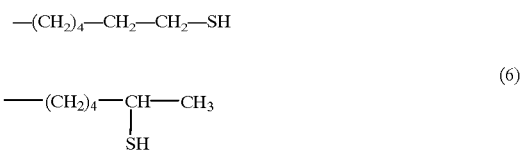

(6)

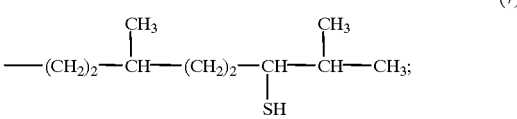

(7)

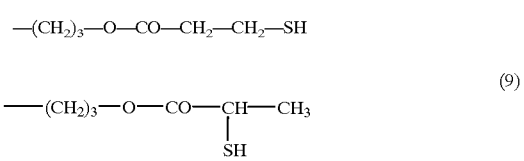

(9)

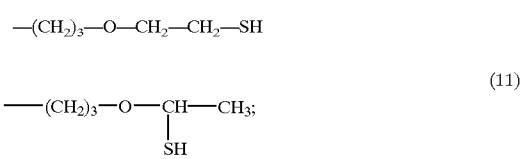

(11)

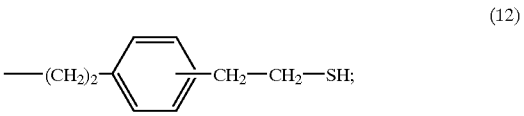

(12)

-continued

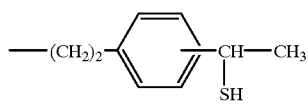
(13)

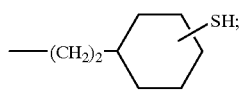
(14)

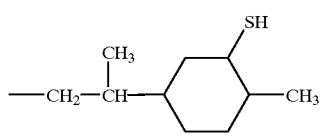
(15)

All the terminal groups A and B of each of the POS copolymers of formulae (I) and (II) have a molar composition of radicals of formulae (i) to (8i) which can vary over wide limits.

Typically (and this is a preferred embodiment), this molar composition is as follows:

0 to 100 mol % of all terminal groups comprise $(R)_3Si$ units, which are provided by the radicals of formulae (i) and/or (5i), 0 to 100 mol % of all terminal groups comprise $(R)_2XSi$ units, which are provided by the radicals of formulae (2i) and/or (6i), 0 to 100 mol % of all terminal groups comprise $R(X)_2Si$ units, which are provided by the radicals of formulae (3i) and/or (7i), and 0 to 20 mol % of all terminal groups comprise $(X)_3Si$ units, which are provided by the radicals of formulae (4i) and/or (8i), the sum of the radicals having in each case to be equal to 100 mol %.

When the symbols A and B represent mixtures formed, respectively, from the radicals (i)+[(2i) and/or (3i) and/or (4i)] and from the radicals (5i)+[(6i) and/or (7i) and/or (8i)], this preferred molar composition may take the following form:

20 to a value less than 100 mol %, such as, for example 20 to 80 mol %, of all the terminal groups comprise $(R)_3Si$ units, which are provided by the radicals of formulae (i) and/or (5i), 0 to 80 mol % of all terminal groups comprise $(R)_2XSi$ units, which are provided by the radicals of formulae (2i) and/or (6i), 0 to 80 mol % of all terminal groups comprise $R(X)_2Si$ units, which are provided by the radicals of formulae (3i) and/or (7i), and 0 to 20 mol % of all terminal groups comprise $(X)_3Si$ units, which are provided by the radicals of formula (4i) and/or (8i), the sum of the radicals having in each case to be equal to 100 mol %.

More typically (and this is a more preferred embodiment), this molar composition is as follows:

20 to 80 mol % of all terminal groups comprise $(R)_3Si$ units, which are provided by the radicals of formulae (i) and/or (5i), 10 to 40 mol % of all the terminal groups comprise $(R)_2XSi$ units, which are provided by the radicals of formulae (2i) and/or (6i), 10 to 40 mol % of all the terminal groups comprise $R(X)_2Si$ units, which are provided by the radicals of formulae (3i) and/or (7i), and 0 to 10 mol % of all the terminal groups comprise $(X)_3Si$ units, which are provided by the radicals of formulae (4i) and/or (8i), the sum of the radicals having in each case to be equal to 100 mol %.

The initial POSs of formula (II) preferably used are those for which the symbols A, B, R, X and Y and the molar composition of the terminal groups have simultaneously the preferred definitions given above, the sum a+b lies within the range 10 to 100, a is a number ranging from 1 to 50 and b is a number ranging from 1 to 50.

The initial POSs of formula (II) more preferably used are those for which the symbols A, B, R, X and Y and the molar composition of the terminal groups have simultaneously the more preferred definitions given above, the sum a+b lies within the range 10 to 70, a is a number ranging from 1 to 40 and b is a number ranging from 1 to 30.

The POSs of formula (II) are products which can be obtained using the process which is described in document WO-A-96/16125, the entire contents of which are incorporated for reference. This process essentially consists, by applying an operating method advantageously carried out in a batch manner: on the one hand, in making a poly (hydrogenoorgano)siloxane carrying hydrogen functional groups react with at least one alcohol XH, from which the alkoxyl functional group X is derived, this alcohol being used as a reactant and as a reaction solvent, in the presence of an appropriate catalyst, according to a dehydrogenocondensation mechanism using a fraction of the $\equiv$SiH groups initially available; and on the other hand, in adding the POS thus obtained by dehydrogenocondensation onto at least one compound containing at least two ethylenically unsaturated groups from which the unsaturated functional group Y is derived, according to a hydrosilylation mechanism carried out using the remaining $\equiv$SiH groups.

The initial POSs of formula (II) are products which can also be obtained using the (semi)continuous industrial process described in the French Patent Application filed by the Applicant on Aug. 6, 1996 under the No. 96/10086, the entire contents of which are incorporated by reference.

According to this process:

1. a dehydrogenocondensation reactor A is continuously fed with: a precursor POS consisting of a poly (hydrogenoorgano)siloxane having at least in the chain $RHSiO_{2/2}$ units where the symbols R are as defined above (reactant denoted hereinafter by the expression "POS containing SiH"); an alcohol of formula XH, from which the alkoxyl functional group X is derived, serving as a reactant and a reaction solvent; and an appropriate platinum-based catalyst; carrying out the dehydrogenocondensation reaction at atmospheric pressure or at a higher pressure and at the reflux temperature of the reaction mixture, according to a mechanism using a fraction of the $\equiv$SiH groups initially available;

2. the gas formed is discharged and recovered continuously, the hydrogen that it contains being eliminated and the alcohol XH being recycled by condensation; and 3. the POS thus obtained by dehydrogenocondensation (the compound denoted hereinafter by the expression "POS containing SiX and SiH") is transferred immediately into a hydrosilylation reactor B where the compound containing at least two ethylenically unsaturated groups, from which the unsaturated functional group Y is derived, is added according to a hydrosilylation mechanism carried out using the remaining $\equiv$SiH groups in order, finally, to recover a POS of formula (II) containing SiX and SiY functional groups.

More specifically, this (semi)continuous process is carried out using the apparatus described in the lines which follow and in the single appended figure.

The apparatus illustrated comprises a continuous dehydrogenocondensation reactor A and a batch hydrosilylation reactor B.

The reactor A essentially consists of a vessel 1 in the general form of a hollow cylindrical column. This column is subdivided, on the one hand, into at least one—in this case one—bottom reaction chamber 2 and, on the other hand, into a top chamber 3 which forms part of the rapid gas discharge and recovery means and which contains the hydrogen separation means.

The bottom chamber 2 is provided with at least one—in this case one—tray 40 forming the bottom of a main compartment 5, intended to serve as the seat for at least part of the dehydrogenocondensation of the POS containing SiH. In this illustrative embodiment, the bottom chamber 2 of A is of the multi-stage type and includes at least one—preferably one to three and, in this case, three—other, lower stage in addition to that corresponding to the main compartment 5.

Each lower stage comprises a bottom formed by at least one—in this case one—tray 41, 42, 43 defining, with the bottom of the immediately upper stage, a compartment 6, 7 and 8, respectively, for the trays 41, 42, 43.

These trays 40 to 43 are, in fact, transverse partitions delimiting the compartments 5 to 8, the tray 43 furthermore defining, with the bottom of the column 1, a base 9 which is used as the receptacle for collecting the liquid reaction mixture, which contains the POS containing SiX and SiH, and is connected to the reactor B by at least one transfer pipe 10.

Each tray 40, 41, 42, 43 comprises at least one (in this case one) overflow device (13, 13') allowing the level of reaction liquid to be adjusted. The reference 13 denotes the overflow of the tray 40 (main compartment 5). The references 13' denote the overflows of the trays 41, 42, 43 (lower compartments 6, 7 and 8).

The main compartment 5 is that into which the reactant feed pipe(s) 11 and 12 run. The overflow device 13 with which this main compartment 5 is equipped determines a given level for the liquid reaction mixture in the compartment 5. This overflow 13 brings the compartment 5 into communication with the lower level of the bottom chamber 2, where the transfer pipe 10 is. In the present example, this lower level of the bottom chamber 2 corresponds with the base 9, which is separated from the main compartment 5 by three lower compartments 6, 7, 8. Furthermore, the main compartment 5 is connected, by its upper part, with the top chamber 3.

The main compartment 5 may be fed continuously with the liquid reaction mixture via the feed pipes 11 and 12. The latter continuously convey the POS containing SiH and the alcohol reactant HX as a mixture (solution) with the platinum catalyst. These reactants flow onto the tray 40, through which the overflow device 13 formed by a cylindrical tube pierced with an orifice 14 passes, through which orifice the excess liquid reaction mixture can be discharged and conveyed into the lower compartment 6. This overflow tube 13 is axial with respect to the vessel 1 of the reactor A and is preferably extended upwards in order to bring the compartment 5 into communication with the top chamber 3. To do this, the tube 13 extends through a separating partition 15. The upper part of the tube 13, emerging in the top chamber 3 above the partition 15, is provided with an opening 16. This tube 13 allows the gas formed in the main compartment 5 to be rapidly discharged into the top chamber 3.

This tube 13 may, optionally, be equipped with at least one non-return valve instead of the orifice 16. One or more tubes 13 for conveying the gases from the compartment 5 to the top chamber 3 may be provided.

The other overflow devices 13', with which the trays 41, 42 and 43 are equipped, also consist of cylindrical tubes whose axes are not mutually aligned. The height of that part of each tube 13' which is above the bottom 41, 42, 43 determines the level of the reaction liquid overflow above which the reaction liquid will flow into the lower stage. Thus, each lower compartment 6, 7, 8 just as for the base 9, is intended to be fed with the liquid reaction mixture via the overflow 13, 13' of the stage immediately above. The bottom of the lowest stage 8 communicates via its overflow 13' with the base 9 of the reactor A so as to allow the POS containing SiX and SiH to be collected. The residence time of the liquid reaction mixture in each compartment may be adjusted, as required, by varying the withdrawal levels of the various trays 40, 41, 42, 43.

Drain pipes 17 are connected to the bottom part of each compartment 5, 6, 7, 8. These pipes 17 include valves, illustrated by symbols in the drawing but not given a reference number.

With regard to the top chamber 3, this is delimited vertically by the partition 15 which separates it from the bottom chamber 2 and by the top of the column 1 of the reactor A. It should be pointed out that it forms part of the means for rapidly discharging and recovering the gases released in the bottom chamber 2 during operation. This gas then passes, in succession, through the orifice 14, the slot and the opening 16 in the tube 13.

According to one characteristic of the device used, this top chamber 3 includes means 18 for separating the hydrogen from the other components of the gas which is produced during the dehydrogenocondensation. In practice, these other components are the vapour of volatile compounds, in particular vapour of the alcohol employed. The means 18 therefore consist of at least one—in this case one—condenser shown in symbolic form by a coil in the top chamber 3 and fed with a refrigerant flowing in the direction indicated by the arrows F illustrated in the drawing.

The latter also shows, diagrammatically, a pipe 19 for discharging the hydrogen separately from the vapour of the volatiles. This pipe 19 is connected to the upper part of the column 1. Moreover, it is on this pipe 19, or on a part connected to the latter, that means may be provided, for example, for continuously determining the degree of substitution of the SiH units of the initial POS containing SiH, so as to allow the latter to be regulated. These means preferably consist essentially of at least one hydrogen counter, advantageously linked to a computing unit. Such means, not given reference numbers and not illustrated, may be connected to a system for continuously controlling and regulating the degree of substitution, also called the degree of conversion. This control system could, for example, provide regulation by acting on the feed rates and/or on the residence times in the various stages by modifying the spillover heights of each overflow 13, 13'.

The condensate, produced by the condenser 18, is recovered in the bottom of the top chamber 3, consisting of the partition 15. This condensate may be withdrawn from the base of this chamber 3 via a pipe 20 connected to a storage tank and/or to a circuit for recycling the said condensate (which essentially consists of alcohol) into the dehydrogenocondensation reaction. In such a condensate-recycling variant, the withdrawal pipe 20 would then be connected to the main compartment 5, so as to allow the latter to be fed with recovered alcohol. This variant corresponds to a preferred way of implementing the process described here and to a preferred embodiment of the apparatus described here.

According to another variant, the bottom (or partition) 15 is omitted. Under these conditions, the alcohol condensate recovered is collected directly in the main compartment 5 on the tray 40.

Such a multi-stage continuous reactor A makes it possible to have large exchange surface areas, which facilitate the dehydrogenocondensation and the discharge of the gas formed, which contains hydrogen and the vapour of volatiles. By multiplying the stages, this exchange surface area is correspondingly increased and it can also be increased by varying the diameter of the column and of the separating trays 40 to 43.

Such a reactor A makes it possible to optimize the free surface area for departure of the hydrogen, thereby preventing unacceptable foaming. It also offers the possibility of accurately controlling the degree of substitution of the SiH units of the initial POS containing SiH by the alkoxyl functional groups X by providing a control mechanism as represented above.

The means 18 for separating hydrogen from the vapours of volatiles (essentially alcohol) by condensation make it possible to control the gas flow rate and to recover and recycle the condensates, thus having the incidental effect of conveniently removing the heat of reaction, while at the same time controlling the temperature of the reaction mass well.

Finally, safety is optimized because of the fact that this reactor allows the POS containing SiX and SiH obtained to be transferred into the reactor B for the purpose of neutralizing it by hydrosilylation as soon as the asymptotic degree of conversion or of substitution into the alkoxyl functional groups X is reached.

In the present example, the reactor B is a batch hydrosilylation reactor, denoted by the reference number 21. It is a tank having stirring means 22 formed, for example, by a propeller stirrer. The bottom of this reactor 21 is connected to a pipe 23 allowing recovery of the desired POS (II) once the latter has formed.

In its upper part, this reactor 21 comprises means 24 for recovering the gaseous efflux, consisting of a column communicating with the inside of the reactor 21 and preferably comprising equipment 25 for treating the efflux in order to separate hydrogen from the other gases. The latter consist of the vapour of the volatile reactive compounds, which may be the compound with a mobile hydrogen (alcohol) and the compound to be hydrosilylized containing at least two ethylenically unsaturated groups (from which the unsaturated functional group Y is derived).

Like the means 18 of the reactor A, this equipment 25 consists of at least one—in this case one—condenser for condensing the vapour of the volatiles. This condenser is, for example, a coil (illustrated in symbolic form in the figure) through which a refrigerant flows, the flow being indicated in the drawing. The condensates may be recovered in the bottom 25 of the condenser in order to be stored and/or recycled.

Thus, the novel process according to the invention therefore consists in bringing H$_2$S into contact with the initial POS of formula (II).

From a practical standpoint, the process is carried out in a standard closed reactor allowing liquid and gas to be brought into contact with a catalyst, which optionally is a heterogeneous catalyst, the process optionally being carried out under pressure; the pressure is not a critical parameter, but it is advantageous to proceed under a pressure at least equal to $1\times10^5$ Pa and, preferably, within the range $5\times10^5$ to $20\times10^5$ Pa and even more preferably $7\times10^5$ to $14\times10^5$ Pa.

The H$_2$S feed conditions are determined so as to produce a molar excess of H$_2$S with respect to the ethylenically unsaturated group of the POS of formula (II), which is at least equal to 5%.

With regard to the reaction temperature, this preferably lies within the range 50° C. to 120° C.

As catalyst to be used, radical initiator compounds are suitable, such as, for example, azo-organic compounds, organic peroxides and organic percarbonates, these being used alone or in combination with promoters such as, for example nickel and/or trivalent phosphorus compounds; for more details, reference may be made in particular to document FR-A-2,048,451, the entire contents of which are incorporated for reference.

It is preferable to use, as catalyst, at least one free-radical initiator compound belonging to the family of azo-organic compounds and organic peroxides. It is more preferable to use at least one radical initiator compound belonging to the family of azo-organic compounds such as, for example, 2,2'-azobis(2,4-dimethylpentanenitrile), 2,2'-azobis (isobutyronitrile), 2-(tert-butylazo)-2,4-dimethyl-pentanenitrile, 2-(tert-butylazo)isobutyronitrile, 2-(tert-butylazo)-2-methylbutanenitrile and 1,1-azobis (cyclohexanecarbonitrile). The catalyst most especially adopted is 2,2'-azobis(isobutyronitrile) (abbreviated to AIBN).

For most of the reactions, the amount of catalyst, expressed as a percentage per weight of catalyst with respect to the initial POS of formula (II), lies within the range 0.1 to 10% and preferably 0.5 to 4%.

The reactions between H$_2$S and the initial POS of formula (II) may be carried out in bulk in a solvent-free heterogeneous medium, but preferably they are carried out in a homogeneous medium by the addition of a solvent or of a mixture of solvents common to the POS (II) and to the catalyst. The preferred solvents are of the aprotic non-polar type such as, for example, chlorobenzene, toluene, xylene, hexane, cyclohexane, octane and decane. The solvents more preferably adopted are toluene and xylene.

The duration of the reactions is not critical; it may, for example, lie between 1 hour and 4 hours for temperatures of about 70 to 90° C.

The process according to the invention may be implemented in batch mode or continuously, according to any operating method known per se. One operating method which is very suitable is the following: firstly, the reactor is fed with solvent and the POS (II) and then it s brought into permanent communication with the H$_2$S source, in order to saturate the reaction mixture with the gas; secondly, the catalyst solution is then poured into the reactor. Another very suitable operating method is the following: firstly, the reactor is fed with solvent and then brought into permanent communication with the H$_2$S source, in order to saturate the reaction mixture with the gas; and secondly, a solution based on the catalyst and the POS (II) is then poured into the reactor.

The multifunctionalized POSs of formula (I) defined above, which are obtained by the process also described above, in the structure of which the symbols n and q represent simultaneously numbers equal to zero, are known products which can be prepared using the information given in document WO-A-96/16125 in the name of the Applicant. The other multifunctionalized POSs of formula (I) defined above, obtained by the process also described above, in the structure of which:

either the symbol n is a number equal to zero and the symbol q then represents a number different from zero,
or the symbol n represents a number different from zero and the symbol q then represents a number which is equal to zero or different from zero, are products which, to the knowledge of the Applicant, are novel and these form a second subject of the present invention. Among these POSs, those which are particularly novel are the POSs of formula (I) for which the symbol n represents a number different from zero and the symbol q then represents a number which is equal to zero or different from zero.

According to others of its object, the present invention also relates to the use of an effective amount of at least one (known and/or novel) multifunctionalized POS of formula (I) defined above, obtained by the process also described above, especially as an anti-blocking modulator in silicone compositions or as a white-filler coating agent, especially a siliceous filler, for the purpose of aiding the processing of the filler in filled silicone compositions and of allowing the silicone products obtained to be reinforced. These multifunctionalized POSs of formula (I) may also be used advantageously—and this is a preferred mode of application—as a white-filler/elastomer coupling agent in rubber compositions containing a white filler, especially a siliceous substance, as a reinforcing filler.

The envisaged applications relate, of course, to all the multifunctionalized POSs of formula (I), whether they are known or novel, for which the symbols n, q, A and B (especially) satisfy all the definitions given above with regard to the formula (I) which was indicated in the preamble of the description of the process according to the invention.

In the rest of the present specification, this other subject of the present invention, constituting the use of at least one multifunctionalized POS of formula (I) as white-filler/elastomer coupling agent in compositions of natural or synthetic elastomer(s) of the rubber type, containing a white filler, especially a siliceous substance, as a reinforcing filler, which are intended for the manufacture of articles made of elastomer(s), will now be explained in greater detail.

The types of articles made of elastomer(s) for which the invention is most useful are those subject especially to the following constraints: variations in temperature and/or variations in high-frequency stressing in a dynamic regime; and/or a high static stress; and/or a high level of flexural fatigue in a dynamic regime. Such articles are, for example: conveyor belts, power transmission belts, hoses, expansion joints, seals for domestic electrical appliances, mounts whose function is to absorb the vibrations of engines, either with metal rein-forcements, or with a hydraulic fluid in the elastomer, spring components placed between the rigid articulated metal elements of the track of a vehicle in contact with the ground, cables, cable sheaths, shoe soles and wheels for cableways.

The field of the invention is that of high-performance use capable of providing elastomer compositions which have especially: for very easy processing of the uncured compounds prepared, in particular in extrusion and calendering operations, rheological properties marked by the lowest possible viscosity values; in order to achieve excellent productivity of the curing plant, the shortest curing times possible; and, in order to meet the constraints of the uses mentioned above, excellent reinforcement properties conferred by a filler, in particular optimum values of tensile modulus of elasticity, tensile strength and abrasion resistance.

In order to achieve such an objective, many solutions have been proposed which have essentially focused on the use of elastomer(s) modified with a white filler, especially silica, as a reinforcing filler. It is known, in general, that, in order to obtain the optimum reinforcement properties conferred by a filler, it is necessary for the latter to be present in the elastomer matrix in a final form which is both as finely divided as possible and distributed as homogeneously as possible. Such conditions can be realized only if the filler can be very easily incorporated into the matrix during the process of mixing it with the elastomer(s) and can break up or deagglomerate very easily and be dispersed homogeneously in the elastomer matrix very easily. The use of a single reinforcing white filler, especially a single reinforcing silica, has proved to be inappropriate because of the low level of certain properties of such compositions and more consequently, of certain properties of the articles using these compositions.

In addition, for reasons of reciprocal affinities, the white filler particles, especially silica particles, have an annoying tendency to agglomerate among themselves in the elastomer matrix. These filler/filler interactions have the undesirable consequence of limiting the reinforcement properties to a level substantially below that which would theoretically be possible to achieve if all the white-filler/elastomer bonds capable of being created during the mixing operation were actually obtained.

In addition, the use of the white filler raises processing difficulties due to filler/filler interactions which, in the uncured state, tend to increase the viscosity of the elastomer compositions, in any case to make processing more difficult. Finally, the interactions between the white filler and the crosslinking system when it is based on sulphur have an adverse effect on the crosslinking rate and yield.

It is known to those skilled in the art that it is necessary to use a coupling agent which reacts with the white filler particles in order to create strong interactions between the surface of the filler and the elastomer(s) and a true network between the elastomer chains, while at the same time facilitating the dispersion of the white filler within the elastomer matrix.

For example, in order to increase the affinity of the silica with the elastomer matrix, it has been proposed previously to use: a hydrolysable silane containing a single sulphur atom such as, for example, γ-mercaptopropyltrimethoxysilane or γ-mercaptopropyltriethoxysilane (cf. U.S. Pat. No. 3,350, 345 and FR-A-2,094,859) and/or a hydrolysable silane containing several sulphur atoms such as, for example, bis[3-(trimethoxysilyl)propyl or 3-(triethoxysilyl)propyl]-polysulphide (disulphide, trisulphide, tetrasulphide, pentasulphide or hexasulphide) (cf. FR-A-2,206,330). However, these coupling silanes do not make it possible to provide the best possible compromise in the case of vulcanizates filled with silica, in terms of being safe from "scorching" (any premature curing should be avoided), of processability, of reinforceability and of the activity-to-cost ratio of the coupling agent.

In order to try to improve this compromise, it has more recently been proposed to use, by way of coupling agents, combinations based, on the one hand, on a polyorganosiloxane functionalized by polar groups (in particular, hydroxyl groups and/or alkoxyl groups) and, optionally, by organic groups such as, for example long alkyl chains, the 2-(cyclohex-3-enyl)ethyl residue or the 2-(4-methylcyclohex-3-enyl)propyl residue and, on the other hand, on at least one hydrolysable silane chosen from the group of silanes containing a single sulphur atom and containing several sulphur atoms, for example of the type of those mentioned above (cf. EP-A-0,731,133, WO-A-96/29364, EP-A-0,761,748). However, this approach does not make it possible to obtain a completely satisfactory result because of the fact that the functionalized polyorganosiloxane and the silane find themselves in competition for reacting on the surface of the silica, which may result in poor reproducibility of the optimum coupling properties.

In light of the prior art, it would therefore seem that there is an unsatisfied need in terms of high-performance uses of coupling agents based on silicone compounds in elastomer compositions containing a siliceous substance as reinforcing filler or, more generally, containing a white reinforcing filler.

This objective is achieved by the use of an effective amount of at least one multifunctionalized POS of formula (I) defined above, obtained by the process also described above, as white-filler/elastomer coupling agent in compositions of natural or synthetic elastomer(s) containing a white filler as reinforcing filler, which are intended for the manufacture of articles made of elastomer(s).

The multifunctionalized POSs preferably chosen are the POSs of formula (I) selected from those obtained by making H$_2$S react on the "preferably" used POSs of formula (II) described above, which have identical or different symbols Z, each representing a chain R" linked to an SH group of secondary nature.

The expression "SH group of secondary nature" should be understood to mean SH groups which are chosen from the groups of types (1), in which at least one of the radicals R$^2$ and R$^3$ is different from a hydrogen atom, (2), (3) and (4), these types (1) to (4) satisfying the definitions given above with regard to the formula (I) and being taken here in their preferred meaning.

The multifunctionalized POSs chosen more preferably are the POSs of formula (I) selected from those obtained by making H$_2$S react on the "more preferably" used POSs of formula (II) described above, which have identical or different symbols Z, corresponding this time to the sequences (6), (7), (9), (11), (13), (14) and (15) satisfying the definitions given above.

Multifunctionalized POSs which are most especially suitable in this coupling agent application are the POSs of formula (I) in which:
R=methyl,
X=methoxyl or ethoxyl;

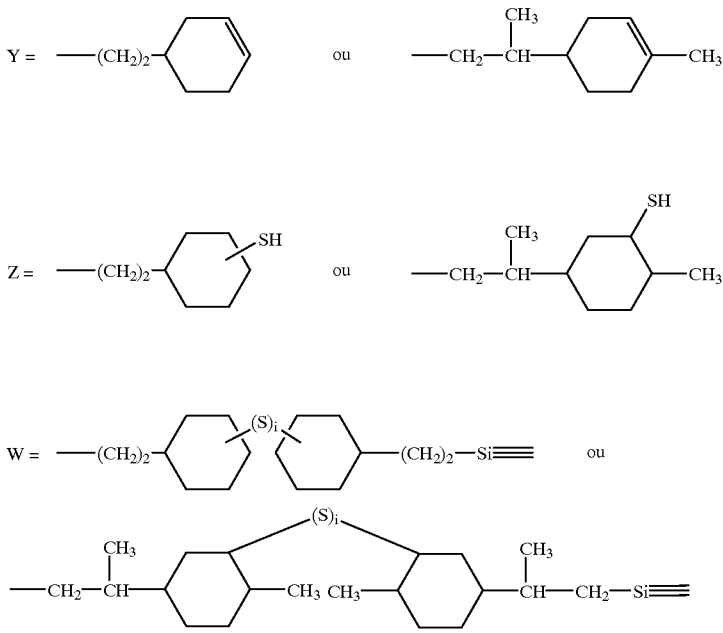

where i is an integer equal to 1 or 2;
m+n+p+q goes from 10 to 70;
m goes from 1 to 40;
n+p+q goes from 1 to 30;
n goes from 0 to 20;
p goes from 1 to 25;
q goes from 0 to 3;
20 to 80 mol % of all the terminal groups A and B contain the (CH$_3$)$_3$Si units provided by the radicals of formulae (I) and/or (5i) where R=methyl; 10 to 40 mol % of the terminal groups contain the (CH$_3$)$_2$(OCH$_3$)Si or (CH$_3$)$_2$(OC$_2$H$_5$)Si units provided by the radicals of formulae (2i) and/or (6i) where R=methyl and X=methoxyl or ethoxyl; 10 to 40 mol % of the terminal groups contain the CH$_3$(OCH$_3$)$_2$Si or CH$_3$(OC$_2$H$_5$)$_2$Si units provided by the radicals of formulae (3i) and/or (7i); and 0 to 10 mol % of the terminal groups contain the (OCH$_3$)$_3$Si or (OC$_2$H$_5$)$_3$Si units provided by the radicals of formulae (4i) and/or (8i); the sum of the radicals having in each case to be equal to 100 mol %.

Within the context of this coupling agent application, the present invention also relates to compositions of elastomer(s) containing a white reinforcing filler which are obtained by the use of an effective amount of at least one multifunctionalized POS of formula (I).

More specifically, these compositions contain (the parts are given by weight):

per 100 parts of elastomer(s), 10 to 100, and preferably 20 to 80, parts of white reinforcing filler, 0.5 to 15, and preferably 2 to 10, parts of POS per 100 parts of white reinforcing filler.

In the present specification, the expression "white reinforcing filler" should be understood to mean a white filler capable of reinforcing by itself, without means other than that of a coupling agent, a composition of natural or synthetic rubber-type elastomer(s).

The physical state in which the white reinforcing filler is in is of no matter, that is to say that the said filler may be in the form of a powder, microbeads, granules or balls.

Preferably, the white reinforcing filler consists of silica, alumina or a mixture of these two species.

More preferably, the white reinforcing filler consists of silica, taken alone or as a mixture with alumina.

By way of silica capable of being used in the invention, all precipitated or pyrogenic silicas known to those skilled in the art having a BET specific surface area $\leqq 450$ m$^2$/g are suitable. Precipitated silicas, which may be conventional or highly dispersible, are preferred.

The expression "highly dispersible silica" should be understood to mean any silica which can be very readily deagglomerated and dispersed in a polymeric matrix, observable by electron or optical microscopy on thin sections. As non-limiting examples of highly dispersible silicas, mention may be made of those having a CTAB specific surface area equal to or less than 450 m$^2$/g and particularly those described in U.S. Pat. No. 5,403,570 and Patent Applications WO-A-95/09127 and WO-A-95/09128, the contents of which are incorporated here.

The precipitated silicas which are very suitable are more preferably those having:

a CTAB specific surface area of between 100 and 240 m$^2$/g, preferably between 100 and 180 m$^2$/g, a BET specific surface area of between 100 and 250 m$^2$/g, preferably between 100 and 190 m$^2$/g, a DOP oil uptake of less than 300 ml/100 g, preferably between 200 and 295 ml/100 g, and a BET specific surface area/CTAB specific surface area ratio ranging from 1.0 to 1.6.

Of course, "silica" should also be understood to mean blends of various silicas. The CTAB specific surface area is determined according to the NFT 45007 (November 1987) method. The BET specific surface area is determined according to the Brunauer, Emmet and Teller method described in "The Journal of the American Chemical Society, Vol. 80, page 309 (1938)" corresponding to the NFT 45007 (November 1987) standard. The DOP oil uptake is determined according to the NFT 30-022 (March 1953) standard using dioctyl phthalate.

By way of reinforcing alumina, it is advantageous to use a highly dispersible alumina having:

a BET specific surface area of between 30 and 40 m$^2$/g, preferably between 80 and 250 m$^2$/g, an average particle size at most equal to 500 nm, preferably at most equal to 200 nm, and a high degree of Al—OH surface reactive functional groups, as described in document EP-A-0,810,258.

As non-limiting examples of similar reinforcing aluminas, mention may be made, in particular, of the aluminas A125, CR125, D65CR from the company Baikowski.

It should be noted that the preferred and more preferred general definitions relating to the white reinforcing fillers, which are given above with regard to the description of the white-filler/elastomer coupling agent application, also apply to the use of the coupling agent application also mentioned previously.

Suitable elastomers capable of being used for compositions according to the second subject of the invention should be understood to mean:

(1) homopolymers obtained by polymerization of a conjugated diene monomer having from 4 to 22 carbon atoms such as, for example: 1,3-butadiene, 2-methyl-1,3-butadiene, 2,3-dimethyl-1,3-butadiene, 2,3-diethyl-1,3-butadiene, 2-methyl-3-ethyl-1,3-butadiene, 2-chloro-1,3-butadiene, 2-methyl-3-isopropyl-1,3-butadiene, 1-phenyl-1,3-butadiene, 1,3-pentadiene and 2,4-hexadiene;

(2) the copolymers obtained by copolymerization of one or more of the aforementioned conjugated dienes among themselves or with one or more ethylenically unsaturated monomers chosen from:

aromatic vinyl monomers having from 8 to 20 carbon atoms such as, for example: styrene, o-methylstyrene, m-methylstyrene or p-methylstyrene, chlorostyrenes, vinylmesitylene, divinylbenzene and vinylnaphthalene;

vinyl nitrile monomers having from 3 to 12 carbon atoms such as, for example, acrylonitrile and methacrylonitrile;

acrylic ester monomers derived from acrylic acid or from methacrylic acid with alkanols having from 1 to 12 carbon atoms such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate and isobutyl methacrylate;

(3) the copolymers obtained by copolymerization of ethylene with an α-olefin having from 3 to 6 carbon atoms such as, for example, the elastomers obtained from ethylene and propylene (EPR elastomers);

(4) the ternary copolymers obtained by copolymerization of ethylene and of an α-olefin having from 3 to 6 carbon atoms with a nonconjugated diene monomer having from 6 to 12 carbon atoms, such as, for example, the elastomers obtained from ethylene and propylene with a nonconjugated diene monomer of the aforementioned type, such as, especially, 1,4-hexadiene, ethylidene norbornene and dicyclopentadiene (EPDM elastomer);

(5) natural rubber;

(6) the copolymers obtained by copolymerization of isobutene and isoprene (butyl rubber), as well as the halogenated, in particular chlorinated or brominated, versions of these copolymers;

(7) a mixture of several of the aforementioned elastomers (1) to (6) amongst themselves;

(8) chlorosulphonated polyethylenes;

(9) fluorinated hydrocarbons; and

(10) elastomers of the epichlorohydrin/ethylene oxide or polyepichlorohydrin type.

Preferably, use is made of one or more elastomers chosen from: polybutadiene, polychloroprene, polyisoprene, poly (styrene-butadiene), poly(acrylonitrile-butadiene) in hydrogenated or non-hydrogenated form, poly(styrene-butadiene-isoprene), an (ethylene-propylene-nonconjugated diene monomer) terpolymer, natural rubber and butyl rubber.

The compositions according to the invention furthermore contain all or some of the other auxiliary additives and constituents normally used in the field of compositions of elastomer(s) and of rubber(s).

Thus, it is possible to use all or some of the other following additives and constituents:

with regard to the cure system, mention may be made of, for example:

curing agents such as, for example, organic peroxides and/or curing agents chosen from sulphur or sulphur-donating compounds such as, for example, thiuram derivatives;

sulphur cure accelerators such as, for example, derivatives of guanidine, derivatives of thiazols or derivatives of sulphenamides;

curing activators such as, for example, zinc oxide, stearic acid and zinc stearate; with regard to other additives, mention may be made, for example, of:

a conventional reinforcing filler such as carbon black (in this case, the white reinforcing filler used constitutes more than 50% of the weight of the white reinforcing filler+carbon black combination);

a conventional barely-reinforcing or non-reinforcing white filler such as, for example, clays, bentonite, talc, chalk, kaolin, titanium dioxide or a mixture of these species;

antioxidants;

antiozonants such as, for example, N-phenyl-N'-(1,3-dimethylbutyl)-p-phenylenediamine;

processing aids and plasticizing agents.

With regard to processing aids, the compositions according to the invention may furthermore contain, as a complement to the multifunctionalized POS of formula (I), agents for coating the white reinforcing filler such as, for example, a hydroxylated silicone oil, a polyol, a hydrolysable silane or a coating polyorganosiloxane.

More specifically, when such a processing aid is used, it is advantageous to use an agent taken from the group formed by:

1) an α, ω-(dihydroxy)polydiorganosiloxane oil of formula:

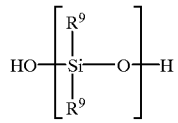

(III)

where: r has a value sufficient to give the oil a dynamic viscosity at 25° C. of between 5 and 1000 mPa.s, preferably between 10 and 200 mPa.s; and the organic radicals $R^9$, because of their availability in industrial products, are methyl, ethyl, propyl and/or phenyl radicals, preferably at least 80% in number of these radicals $R^9$ being methyl radicals;

2) a polyalkylene glycol of formula:

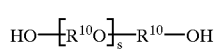

(IV)

where: s has a value sufficient to give the compound of formula (IV) a number-average molecular mass of between 100 and 30,000, preferably between 200 and 20,000; and the radicals $R^{10}$, which may be identical or different, each represent a linear or branched alkylene radical having from 1 to 4 carbon atoms;

3) a hydrolysable silane of formula

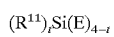

(V)

where: the symbols $R^{11}$ each represent a $C_1$–$C_8$ linear or branched alkyl radical (such as, for example, a methyl, ethyl, propyl or butyl radical), a $C_5$–$C_8$ cycloalkyl radical (such as, for example, a cyclohexyl radical), a $C_6$–$C_{12}$ aryl radical or an aralkyl radical having a $C_6$–$C_{12}$ aryl part and a $C_1$–$C_4$ alkyl part (such as, for example, a phenyl, xylyl, benzyl or phenylethyl radical); the symbols E are hydrolysable groups and each represent a $C_1$–$C_{10}$ alkoxy group (such as, for example, a methoxy, ethoxy or octyloxy group), a $C_6$–$C12$ aryloxy group (such as, for example, a phenyloxy group), a $C_1$–$C_{13}$ acyloxy group (such as, for example, an acetoxy group) or a $C_1$–$C_8$ ketiminoxy group (such as, for example, ON=C(CH$_3$) (C$_2$H$_5$) or ON=C(CH$_3$)$_2$);

4) a coating polyorganosiloxane consisting either of a POS of formula (II) satisfying the definitions given above in the legend of formula (II) or of a similar POS of formula:

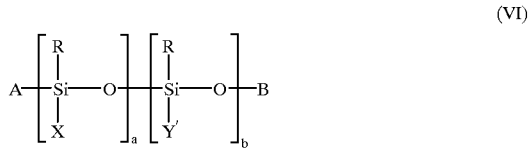

(VI)

in which: the symbols A, B, R, X, a and b satisfy the definitions given above in the legend for formula (II); and the identical or different symbols Y' each represent a $C_7$–$C_{30}$ linear or branched alkyl group (such as, for example, an octyl, dodecyl, undecyl or tridecyl group); the coating POSs of formula (VI) are products which can be obtained according to the processes described in document WO-A-96/16125 and in the French patent application filed by the Applicant on Aug. 6, 1991 under the No. 96/10086 mentioned above; and 5) a mixture of at least two of the aforementioned agents 1) to 4).

Such a processing aid, when one is used, is employed in an amount of from 1 to 10 parts by weight and preferably from 2 to 8 parts, per 100 parts of white reinforcing filler.

The process for preparing the elastomer compositions containing a white reinforcing filler and an effective amount of coupling agent may be carried out in a conventional one-step or two-step operating method.

According to the one-step process, all the necessary constituents apart from the curing agent(s) and, optionally, the accelerator(s) and/or activator(s), are introduced into a standard internal mixer, for example of the Banbury type or of the Brabender type. The result of this first mixing step is then taken to an external mixer, generally a multi-roll mixer, and the curing agent(s) and, optionally, the accelerator(s) and/or activator(s) are added thereto.

It may be advantageous for the preparation of certain articles to use a two-step process in which both steps are carried out in an internal mixer. All the necessary constituents apart from the curing agent(s) and, optionally, the accelerator(s) and/or the activator(s) are introduced in the first step. The is object of the second step which follows is essentially to subject the mixture to an additional heat treatment. The result of this second step is also taken to an external mixer in order to add thereto the curing agent(s) and, optionally the accelerator(s) and/or the activator(s).

The elastomer compositions which have just been described serve for preparing articles made of elastomer(s) having a body comprising the said compositions. These compositions are particularly useful for preparing articles consisting of engine mounts, components of vehicle tracks, shoe soles, cableway wheels, seals for domestic electrical appliances and cable sheaths.

The following examples illustrate the present invention.

EXAMPLES 1 to 3

Examples of a preparation of multifunctionalized POSs of formula (I) by implementing the process according to the invention.

1) Preparation of a POS of Formula (II) Containing ≡Si—OC$_2$H$_5$ and ≡Si—(CH$_2$)$_2$-cyclohexenyl functional units The (semi)continuous industrial process for manufacturing POS containing multifunctional units is employed.

1.1) Products used in the Process

The initial POS containing SiH is a polymethylhydrogenosiloxane oil having trimethylsilyl end groups containing approximately 1584 milliequivalents of ≡SiH units per 100 g of oil.

The alcohol of formula XH, from which the alkoxyl functional group X is derived, is ethanol C$_2$H$_5$OH.

The catalyst is a solution, in divinyltetramethyldisiloxane, of a platinum complex containing 10% by weight of platinum metal ligand-bonded by divinyltetramethyldisiloxane (Karstedt catalyst).

The unsaturated organic compound, from which the functional group Y is derived, is 4-vinyl-1-cyclohexene.

| 1.2) Operating parameters: | |
|---|---|
| POS containing SiH feed rate | 5.3 kg/h |
| ethanol + catalyst feed rate | 4.5 kg/h |
| platinum in ethanol concentration | 20 ppm |
| POS containing SiH inlet temperature | 47° C. |
| ethanol + catalyst inlet temperature | 50° C. |
| bulk temperature at the base of the reactor A | 72° C. |
| gas flow rate | 1.08 m$^3$/h |
| degree of ethoxylation | ~0.63 (*) |
| amount of vinylcyclohexene employed for 10 hours of operation of the reactor A | 51.3 kg |
| bulk temperature in the reactor | 70° C. |

(*) this value is determined by NMR analysis of the silicon of the POS of formula (II); it means that, with respect to 100 initial ≡SiH units, approximately 63 are converted into ≡Si—OC$_2$H$_5$ units 1.3) Operation The POS containing SiH, on the one hand, and the ethanol+platinum catalyst, on the other hand, are introduced into the compartment 5 via the pipes 11 and 12, respectively. The feed rates are as supplied above.

The dehydrogenocondensation reaction takes place in the main compartment 5 with evolution of hydrogen and of volatiles (mainly ethanol) which pass into the top chamber 3 via the tube 13. The volatiles are condensed by the condenser 18 and collected via the pipe 20 and then recycled by sending them into the main compartment 5. The hydrogen, separated from the condensable volatiles, escapes via the pipe 19 and is recovered.

After a certain feed time, the liquid reaction mixture reaches its overflow level in the compartment 5. This level corresponds to a certain residence time equal, in this case, to 2 min 48 s, and flows out into the lower compartment 6. The liquid-overflow volume of the compartment 5 is 470 ml, while, for the other three compartments (stages) 6, 7, 8, this volume is 630 ml. The system of cascaded overflow of the liquid reaction mixture continues in the lower compartments 7 and 8 and finally the POS containing ≡Si—OC$_2$H$_5$ and ≡SiH units, the degree of conversion of which is approximately 0.63, is collected in the base 9. This degree of conversion is adjusted by virtue of a control system comprising a hydrogen sensor and a computing unit which continuously determines the degree of conversion, thereby making it possible to regulate it by varying the flow rates during operation. The overflow heights of the trays 40 to 43 could also be adjusted.

The POS containing ≡Si—OC$_2$H$_5$ and ≡SiH units thus obtained is continuously transferred via the pipe 10 into the reactor B in order to undergo hydrosilylation, rendering it harmless and converting it into a POS of formula (II) containing ≡Si—OC$_2$H$_5$ and ≡Si—(CH$_2$)$_2$-cyclohexenyl units. The volatilized ethanol and vinylcyclohexene are condensed and then recovered and, optionally, recycled using the means 23.

The POS of formula (II) is recovered by draining the reactor 20 using the pipe 22; this is a clear silicone oil having a viscosity of 300 mPa.s at 25° C.

This oil was also subjected to silicon NMR analysis. This is a powerful means of examination for determining the structure and microstructure of silicone copolymers; silicon ($^{29}$Si) NMR has thus made it possible to detect the presence:

alongside of units, lying within the linear chain, of formulae:

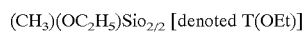
(CH$_3$)(OC$_2$H$_5$)SiO$_{2/2}$ [denoted T(OEt)]

[denoted D]

of units, located at the chain ends, of formulae:

(CH$_3$)$_3$SiO$_{1/2}$ [denoted M]

(CH$_3$)$_2$(OC$_2$H$_5$)SiO$_{1/2}$ [denoted D(OEt)]

(CH$_3$)(OC$_2$H$_5$)$_2$SiO$_{1/2}$ [denoted T(OEt)$_2$]

and of units [denoted T] of formula CH$_3$SiO$_{3/2}$ in a very minor amount.

The $^{29}$Si NMR analysis reveals the following distribution of the various units:

| Units | mol % (*) |
|---|---|
| M | ~3.86 |
| D(OEt) | ~1.32 |
| D | ~33.90 |
| T(OEt)$_2$ | ~1.40 |
| T(OEt) | ~58.74 |
| T | ~0.78 |

(*) the value indicated expresses the number of units per 100 silicon atoms.

Taking into account the terminal groups of types M, D(OEt) and T(OEt)$_2$, the $^{29}$Si NMR analysis makes it possible to assign the oil the following average formula:

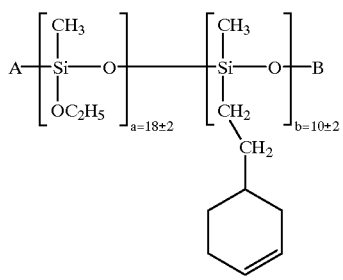

with, for all the terminal groups A and B, the molar composition given below:

| Terminal groups | Composition |
| --- | --- |
| (CH$_3$)$_3$SiO— and/or —Si(CH$_3$)$_3$ | ~58.7% |
| (CH$_3$)$_2$(OC$_2$H$_5$)SiO— and/or —Si(CH$_3$)$_2$(OC$_2$H$_5$) | ~20.1% |
| (CH$_3$)(OC$_2$H$_5$)$_2$SiO— and/or —Si(CH$_3$)(OC$_2$H$_5$)$_2$ | ~21.2% |

2) Preparation of several POSs of formula (I) containing ≡Si—OC$_2$H$_5$ and ≡Si-(ethylenecyclohexylene)-SH functional units:

V1 g of dry toluene and then M1 g of the silicone oil obtained after the above step 1) are put into a 2-liter stainless steel reactor equipped with a stirring system and with an H$_2$S gas feed system, the internal volume of which reactor is maintained under an atmosphere of dry nitrogen.

Next, the internal volume of the reactor thus charged is swept with H$_2$S. The mixture is stirred and the reaction mixture is raised to a temperature of T1° C. under an H$_2$S pressure equal to P1 expressed in Pa. Next, a solution of a catalyst based on M2 g of AIBN and of V2 g of dry toluene is gradually poured in over t1 minutes. After the solution has been poured in, the reaction mixture is left to react for t2 minutes at a temperature of T1° C. with stirring.

After a time t2, the apparatus is purged using a stream of nitrogen and then the solvent is evaporated in a rotary evaporator by heating to approximately 80–100° C. under a reduced pressure of approximately 7×10$^2$ Pa for 1 hour 30 minutes.

Thus, M3 g of a slightly yellow silicone oil is recovered and analysed by proton and $^{29}$Si NMR.

The following table gives the operating conditions of the process for each of the preparations made:

From $^{29}$Si NMR analyses carried out on the POSs of formula (I) of Examples 1 to 3, the following average distribution of the various units is found:

| Units | mol % |
| --- | --- |
| M | ~3.58 |
| D(OEt) | ~1.22 |
| D(*) | ~33.92 |
| T(OEt)$_2$ | ~1.31 |
| T(OEt) | ~59.43 |
| T | ~0.54 |

(*) D here represents the cyclic functional units (n, p, q) lying within the chain.

Taking into account the terminal groups of types M, D(OEt) and T(OEt)$_2$, $^{29}$Si NMR analysis makes it possible to assign the following average formula to the oils of Examples 1 to 3:

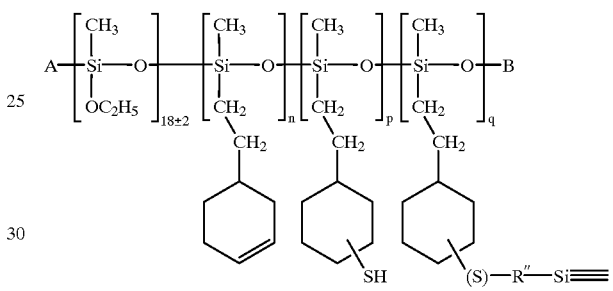

where:
  n+p+q=10±2 (the molar distribution of the parameters n, p and q being established as indicated below)

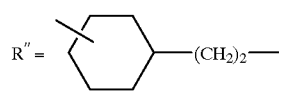

(the free valency of the methylene being bonded to the silicon atom);

all the terminal groups A and B have the average molar composition given below:

| Terminal groups | Average composition |
| --- | --- |
| (CH$_3$)$_3$SiO— and/or —Si(CH$_3$)$_3$ | ~58.6% |

| Example | V1 g | M1 g | T1 ° C. | P1 10$^5$ Pa | t1 min | M2 g | V2 g | t2 min | M3 g |
| --- | --- | --- | --- | --- | --- | --- | --- | --- | --- |
| 1 | 415.14 | 140.02 | 70 | 13 | 60 | 4.22 | 214.84 | 130 | 121 |
| 2 | 403.98 | 140.59 | 70 | 13 | 90 | 4.20 | 210.07 | 240 | 119 |
| 3 | 415.30 | 140.09 | 70 | 13 | 60 | 4.21 | 210.77 | 120 | 120 |

-continued

| Terminal groups | Average composition |
|---|---|
| (CH$_3$)$_2$(OC$_2$H$_5$)SiO— and/or —Si(CH$_3$)$_2$(OC$_2$H$_5$) | ~20.0% |
| (CH$_3$(OC$_2$H$_5$)$_2$SiO— and/or —Si(CH$_3$)OC$_2$H$_5$)$_2$ | ~21.4% |

Proton NMR analysis has made it possible to determine the following molar composition, given in the table below, for the cyclic functional units:

| | Molar composition in % | | |
|---|---|---|---|
| Example | n | p | q |
| 1 | 18.9 | 72.5 | 8.6 |
| 2 | 17.9 | 73.3 | 8.8 |
| 3 | 15.8 | 75.2 | 9.0 |

EXAMPLES 4 and 5

These examples illustrate the use and behaviour of the multifunctionalized POS of formula (I) prepared in Example 2 (POS-2) in, on the one hand (Example 4), an elastomer composition representative of formulations for shoe soles and, on the other hand (Example 5), an elastomer composition representative of formulations for components of vehicle tracks, the said compositions being reinforced by a white filler based on a highly dispersible precipitated silica.

1) Constitution of the compositions:

The following compositions, the constitution of which, expressed in parts by weight, is indicated in Table I given below, are prepared in a Brabender-type internal mixer:

TABLE I

| | | Shoe soles | | Track components | |
|---|---|---|---|---|---|
| Compositions | | Control 1 | Example 4 | Control 2 | Example 5 |
| NR rubber (SMR 5L) | (1) | — | — | 85 | 85 |
| SBR 1502 rubber | (2) | 80 | 80 | — | — |
| BR 1220 rubber | (3) | 20 | 20 | 15 | 15 |
| Silica | (4) | 50 | 50 | 65 | 65 |
| Zinc oxide | (5) | 2 | 2 | 5 | 5 |
| Stearic acid | (6) | 2 | 2 | 2 | 2 |
| Microcrystal-line wax | (7) | — | — | 1 | 1 |
| | | 8 | 8 | — | — |
| Norsolene SP 70 | (8) | 2.5 | 2.5 | 3 | 3 |
| PEG 4000 | (9) | 1 | 1 | — | — |
| MBTS | (10) | 1.2 | 1.2 | — | — |
| CBS | (11) | 0.15 | 0.15 | — | — |
| TMTD | (12) | — | — | 2 | 2 |
| TBBS | (13) | — | — | 1.4 | 1.4 |
| DPG | (14) | 2.1 | 2.1 | 1.7 | 1.7 |
| Sulphur | (15) | — | 4 | — | 4 |
| POS-2 | | | | | |

(1) Natural rubber, of Malaysian origin, sold by the company Safic-Alcan;
(2) Styrene-butadiene copolymer sold by the company Shell Chimie;
(3) Polybutadiene having a high level of 1,4-cis addition products, sold by the company SMPC;
(4) Zeosil 165 GR silica, in the form of granules having an average maximum size of 8 mm, sold by the company Rhône-Poulenc Chimie; CTAB surface area: approxiamtely 160 m$^2$/g, BET surface area: approximately 170 m$^2$/g, and BET/CTAB ratio: approxiamtely 1.06;
(5) and (6) Curing activator;

TABLE I-continued

| | Shoe soles | | Track components | |
|---|---|---|---|---|
| Compositions | Control 1 | Example 4 | Control 2 | Example 5 |

(7) Processing aid, which is a wax sold by the company La Cérésine under the trade name CERELUX ® 120;
(8) Plasticizer, which is an aromatic resin of petroleum origin, sold by the company Norsolor;
(9) Polyethylene glycol having a molecular weight of 4000 (silica/rubber interfacial agent);
(10) Mercaptobenzothiazole disulphide (cure accelerator);
(11) N-cylcohexyl-2-benzothiazyl-sulphenamide (cure accelerator);
(12) Tetramethylthiuram disulphide (cure accelerator);
(13) N-tert-butyl-2-(benzothiazyl) sulphenamide (cure accelerator);
(14) Diphenyguanidine (cure accelerator);
(15) Curing agent.

2) Preparations of the compositions:

The compositions representative of formulations for shoe soles are prepared according to a one-step process in the following manner:

The various constituents are introduced into a Brabender-type internal mixer in the order and at the times and temperatures indicated below:

| Time | Temperature | Constituents |
|---|---|---|
| 0 minute | 100° C. | Elastomers (SBR, BR) |
| 2 minutes | | Silica, PEG 4000, Norsolene and stearic acid |
| 4 minutes | | POS-2 |
| 5 minutes | | Zinc oxide |
| 30 seconds | | |

The mixer is drained when the temperature reaches 160° C. (i.e. after approximately 7 minutes).

The mixture obtained is then introduced into a multi-roll mixer, maintained at 30° C., where it is calendered. The MBTS, CBS, TMTD and sulphur are introduced into this mixer. After homogenization and three passes to the end, the final mixture is calendered into sheets 2.5 to 3 mm in thickness.

The compositions representative of formulations for track components are prepared according to a two-step process in the following manner:

The two steps indicated below are carried out in succession in a Brabender-type internal mixer:

| Time | Temperature | Constituents |
|---|---|---|
| | Step 1: | |
| 0 minute | 100 ° C. | SMR elastomer |
| 2 minutes | | BR elastomer |
| 3 minutes | | ⅔ of the silica, PEG 4000 and wax |
| 4 minutes | | ⅓ of the silica and |
| 30 seconds | | stearic acid |
| 5 minutes | | POS-2 |
| 30 seconds | | |
| 7 minutes | 160° C. | Draining of the mixer |

-continued

| Time | Temperature | Constituents |
|---|---|---|
| Step 2: | | |
| 0 minute | 100° C. | Mixture coming from step 1 |
| 1 minute | | Zinc oxide |
| 3 minutes | 160° C. | Recovery of the mixture |

Next, the mixture obtained from step 2 is introduced into a multi-roll mixer in order to be calendered therein, as indicated previously. The TBBS, DPG and sulphur are introduced into this mixer.

3) Rheological properties:

The measurements are carried out on the compositions in the uncured state. The results regarding the Monsanto viscosity test, which is conducted at 170° C. using the Monsanto 100 S rheometer, are given in Table IV below.

According to this test, the composition to be tested is placed in the test chamber regulated at a temperature of 170° C. and the resistive torque countered by the composition to a low-amplitude oscillation of a biconical rotor included in the test chamber is measured, the composition completely filling the chamber in question. From the curve of the variation of the torque as a function of time, the following are determined: the minimum torque, which reflects the viscosity of the composition at the temperature in question; the maximum torque, which reflects the degree of crosslinking caused by the action of the cure system; and the time (T-90) necessary for obtaining a cure state corresponding to 90% of full cure (this time is taken as the optimum cure).

TABLE II

| Monsanto | Shoe soles | | Track components | |
|---|---|---|---|---|
| rheology | Control 1 | Example 4 | Control 2 | Example 5 |
| Minimum torque | 20.4 | 19.3 | 25.7 | 14.7 |
| Maximum torque | 105.6 | 106 | 106.7 | 101.1 |
| Delta torque | 85.2 | 86.7 | 81 | 86.4 |
| T-90 | 6 min 13 s | 7 min 15 s | 6 min 40 s | 3 min 21 s |

4) Mechanical properties:

The measurements are carried out on the optimally cured compositions (temperature: 170° C.; times for each composition: T-90 times indicated in Table II).

The properties measured and the results obtained are given in the following Table III.

TABLE III

| Mechanical properties | | Shoe soles | | Track components | |
|---|---|---|---|---|---|
| | | Control 1 | Example 4 | Control 2 | Example 5 |
| 10% modulus | (1) | 0.51 | 0.65 | 0.7 | 0.88 |
| 100% modulus | (1) | 1.25 | 2.32 | 1.58 | 2.34 |
| 300% modulus | (1) | 3.5 | 9.3 | 4.9 | 8.6 |
| Reinforcement index | (2) | 2.8 | 4 | 3.1 | 3.67 |
| Tensile strength | (1) | 15.3 | 17.7 | 20.5 | 20.6 |

TABLE III-continued

| Mechanical properties | | Shoe soles | | Track components | |
|---|---|---|---|---|---|
| | | Control 1 | Example 4 | Control 2 | Example 5 |
| Shore A hardness | (3) | 66 | 66 | 72 | 73 |
| Abrasion resistance | (4) | 102 | 76 | 163 | 140 |

(1) The tensile tests are carried out in accordance with the information in the NF T 46-002 standard using H2-type test pieces. The 10%, 100% and 300% moduli and the tensile strength are expressed in MPa.
(2) The reinforcement index corresponds to the 300% modulus/100% modulus ratio.
(3) The measurement is carried out according to the information in the ASTM D 3240 standard. The value given is measured at 15 seconds.
(4) The measurement is carried out according to the information in NF T 46-012 standard using Method 2 with a rotating test-piece holder. The measured value is the loss of substance (in mm$^3$) to abrasion; the lower the value the better the abrasion resistance.

In general, the compositions which contain POS-2 have, compared with comparable compositions which do not contain POS-2, substantially higher moduli and also substantially improved abrasion resistance. The hardnesses of the vulcanizates are not modified. This increase in the moduli and this improvement in abrasion resistance indubitably demonstrate that the multifunctionalized POSs of formula (I), and in particular those containing ≡Si-(chain having a secondary SH group) functional units, have a high coupling capability allowing the surface of the silica to be chemically bonded to the rubber.

EXAMPLES 6 to 9

Examples of the preparation of multifunctionalized POSs of formula (I) by implementing the process according to the invention.

1) Preparation of a POS of formula (II) containing ≡Si—$OC_2H_5$ and ≡Si—$(CH_2)_2$-cyclohexenyl units:

The process is carried out in a batch operation.

The initial POS containing SiH is a polymethylhydroxygenosiloxane oil having trimethylsilyl end groups containing approximately 1438 milliequivalents of ≡SiH units per 100 g of oil.

The dehydrogenocondensation reaction is carried out in a 3-liter reactor equipped with a mechanical stirring system, the internal volume of the reactor being maintained under an atmosphere of dry nitrogen.

350 g of toluene are introduced into the reactor together with 0.08 g of Karstedt catalyst. Ethanol (155.9 g) and polymethylhydrogenosiloxane oil (400 g) are introduced at ambient temperature (25° C.) over a period of 5 hours and 10 minutes by means of 2 pouring pumps. The temperature of the mixture gradually changes from 18.7° C. to 39.3° C.

The reaction mixture thus obtained is recovered and then it is poured, over a period of 4 hours 45 minutes, onto a mixture, preheated to 74° C., consisting of 100 g of ethanol, 308.5 g of 4-vinyl-1-cyclohexene and 0.08 g of the Karstedt catalyst. During pouring, the temperature changes from 74°

C. to 79° C. The heating is maintained for 5 hours at 79° C. and, after this time, all the ≡SiH functional units have been consumed. Next, the reaction mixture is devolatilized by heating at 70° C. under a reduced pressure of 5.32×10² Pa for 5 hours. 760.3 g of a clear silicone oil are thus recovered.

This oil was also analysed by silicon (²⁹Si) NMR which thus made it possible to detect the presence:

alongside of units, lying within the linear chain, of formulae:

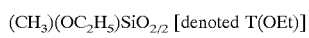

(CH₃)(OC₂H₅)SiO₂/₂ [denoted T(OEt)]

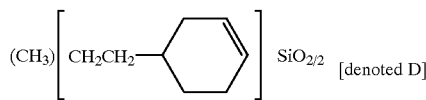

of units, located at the chain ends, of formulae:

(CH₃)₃SiO₁/₂ [denoted M]

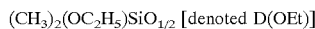

(CH₃)₂(OC₂H₅)SiO₁/₂ [denoted D(OEt)]

and of units [denoted T] of formula CH₃SiO₃/₂ in a very small amount.

²⁹Si NMR analysis shows the following distribution of the various units:

| Units | mol % (*) |
|---|---|
| M | ~10.5 |
| D(OEt) | ~1.0 |
| D | ~36.0 |
| T(OEt) | ~51.5 |
| T | ~1.0 |

(*) The value indicated expresses the number of units per 100 silicon atoms.

Taking into account the terminal groups of types M and D(OEt), ²⁹Si NMR analysis makes it possible to assign the following average formula to the oil:

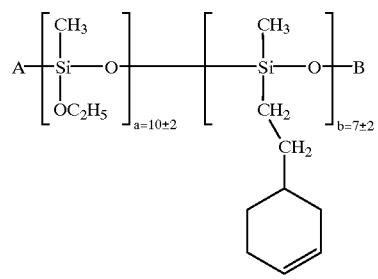

with, for all the terminal groups A and B, the molar composition given below:

| Terminal groups | Composition |
|---|---|
| (CH₃)₃SiO— and/or —Si(CH₃)₃ | ~91.3% |
| (CH₃)₂(OC₂H₅)SiO— and/or —Si(CH₃)₂(OC₂H₅) | ~8.7% |

2) Preparation of several POSs of formula (I) containing ≡Si—OC₂H₅ and ≡Si-(ethylenecyclohexenyl)-SH functional units:

The procedure as indicated above in Examples 1 to 3, part 2) is carried out.

The following table gives the operating conditions of the process for each of the preparations made:

| Example | V1 g | M1 g | T1 ° C. | P1 10⁵ Pa | t1 min | M2 g | V2 g | t2 min | M3 g |
|---|---|---|---|---|---|---|---|---|---|
| 6 | 428.50 | 140.95 | 75 | 13 | 60 | 4.04 | 197.81 | 60 | 119.8 |
| 7 | 425.02 | 140.02 | 75 | 13 | 90 | 4.03 | 200.13 | 60 | 119.0 |
| 8 | 425.16 | 140.21 | 75 | 13 | 60 | 4.03 | 200.11 | 60 | 119.2 |
| 9 | 425.20 | 140.66 | 75 | 13 | 60 | 4.02 | 204.12 | 60 | 119.5 |

The four POSs of formula (I) of Examples 6 to 9 are combined to form the batch which hereafter will be called "POS-(6 to 9)". ²⁹Si NMR analysis shows the following distribution of the various units in this batch:

| Units | mol % (*) |
|---|---|
| M | ~10.5 |
| D(OEt) | traces |
| D (*) | ~36 |
| T(OEt) | ~53 |
| T | <1 |

(*) D represents here the cyclic functional units (n, p, q) lying within the chain.

Taking into account the terminal groups of types M and D(OEt), ²⁹Si NMR analysis makes it possible to assign the following average formula to the POS-(6 to 9) batch:

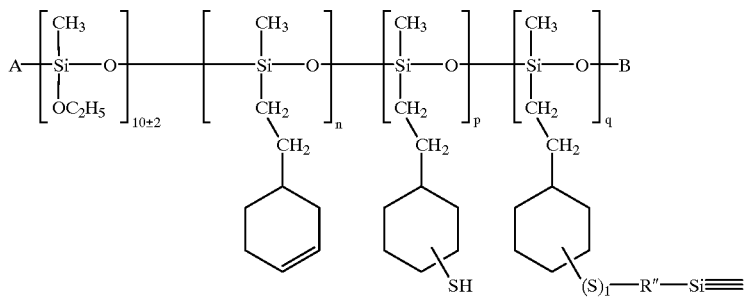

where:

n+p+q=7±2 (the molar distribution of the parameters n, p and q being established as indicated below)

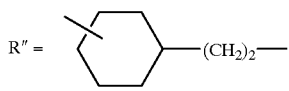

(the free valency of the methylene being linked to the silicon atom);

all the terminal groups A and B have the average molar composition given below:

| Terminal groups composition | Average |
|---|---|
| $(CH_3)_3SiO$— and/or —$Si(CH_3)_3$ | ~100% |
| $(CH_3)_2(OC_2H_5)SiO$— and/or —$Si(CH_3)_2(OC_2H_5)$ | traces |

Proton NMR analysis has made it possible to determine the following molar composition, given in the table below, for the cyclic functional units:

| | Molar composition in % | | |
|---|---|---|---|
| | n | p | q |
| POS-(6 to 9) | 34.3 | 62.8 | 2.9 |

EXAMPLES 10 to 12

These examples illustrate the use and behaviour:

Example 10, of the multifunctionalized POS of formula (I) corresponding to the combination of the POSs prepared in Examples 6 to 9 and called POS-(6 to 9), Example 11, of a combination of the POS-(6 to 9) with a processing aid consisting of an α,ω-dihydroxypolydimethylsiloxane oil having a viscosity equal to 50 mPa.s (oil 48V50), Example 12, of a combination of the POS-(6 to 9) with a processing aid consisting of a coating POS of formula (VI) containing ≡Si—$OC_2H_5$ and ≡Si-octyl functional units (POS-12), in an elastomer composition reinforced by a white filler, representative of formulations for shoe soles.

1) Constitution of the compositions:

The following compositions, the constitution of which, expressed in parts by weight, is indicated in Table IV given below, are prepared in a Brabender-type internal mixer:

TABLE IV

| Compositions | | Control 3 | Example 10 | Example 11 | Example 12 |
|---|---|---|---|---|---|
| NR rubber (SMR 5L) | (1) | 100 | 100 | 100 | 100 |
| Silica | (4) | 50 | 50 | 50 | 50 |
| Zinc oxide | (5) | 3.5 | 3.5 | 3.5 | 3.5 |
| Stearic acid | (6) | 3.5 | 3.5 | 3.5 | 3.5 |
| CBS | (11) | 3 | 3 | 3 | 3 |
| Sulphur | (15) | 1.7 | 1.7 | 1.7 | 1.7 |
| POS-(6 to 9) | | — | 3.5 | 3.5 | 3.5 |
| Oil 48 V 50 | (16) | — | — | 3 | — |
| POS-12 | (17) | — | — | — | 3 |

(1), (4), (5), (6), (11) and (15): cf. definitions given beneath Table I;
(16) The α, ω-dihydroxypolydimethylsiloxane oil having a viscosity equal to 50 mPa.s contains, on average, 3.58 $(CH_3)_2SiO_{2/2}$ siloxyl units per molecule;
(17) Coating POS having the following average formula:

TABLE IV-continued

| Compositions | Control 3 | Example 10 | Example 11 | Example 12 |
|---|---|---|---|---|

$$A \begin{bmatrix} CH_3 \\ | \\ Si-O \\ | \\ OC_2H_5 \end{bmatrix}_{a=17\pm 2} \begin{bmatrix} CH_3 \\ | \\ Si-O \\ | \\ (CH_2)_7 \\ | \\ CH_3 \end{bmatrix}_{b=10\pm 2} B$$

with, for all the groups A and B, the following molar composition:

| Terminal groups | Composition |
|---|---|
| $(CH_3)_3SiO-$ and/or $-Si(CH_3)_3$ | ~46.7% |
| $(CH_3)_2(OC_2H_5)SiO-$ and/or $-Si(CH_3)_2(OC_2H_5)$ | ~17.3% |
| $(CH_3)(OC_2H_5)_2SiO-$ and/or $-Si(CH_3)(OC_2H_5)_2$ | ~36.0% |

In order to prepare the POS-12, the procedure is carried out as indicated in Examples 1 to 3, part 1), replacing the 4-vinyl-1-cyclohexene with 1-octene.

2) Preparation of the compositions:

The compositions representative of formulations for shoe soles are prepared according to a one-step process in the following manner:

The various constituents are introduced into a Brabender-type internal mixer in the order and at the times and temperatures indicated below:

| Time | Temperature | Constituents |
|---|---|---|
| 0 minute | 80° C. | Elastomer |
| 2 minutes | 100° C. | ⅔ of the silica and, where appropriate, POS-(6 to 9) taken alone or in combination with oil 48 V 50 or POS-12 |
| 4 minutes | 120° C. | ⅓ of the silica + stearic acid + zinc oxide |

The mixture obtained is then introduced into a multi-roll mixer, maintained at 60° C., where it is calendered. The CBS and sulphur are introduced into this mixer. After homogenization and three passes to the end, the final mixture is calendered into sheets 2.5 to 3 mm in thickness.

3) Rheological properties:

The mixtures are evaluated in the uncured state according to the Monsanto test carried out at 170° C., as indicated above in Examples 4 and 5, part 3). From the curve of the variation in the torque as a function of the test time, the following are determined: the minimum torque, the maximum torque (and the delta torque) and the T-90 time, together with a scorch time TS-2 corresponding to the time necessary to have a rise of 2 points above the minimum torque at the temperature in question (170° C.) and reflecting the time during which it is possible to process the uncured mixtures at this temperature without initiating the curing reaction.

The results obtained are indicated in Table V.

TABLE V

| Monsanto rheology | Control 3 | Example 10 | Example 11 | Example 12 |
|---|---|---|---|---|
| Minimum torque | 13.8 | 9 | 6.5 | 7.2 |
| Maximum torque | 83.4 | 93.5 | 100.5 | 98.26 |
| Delta torque | 69.6 | 84.5 | 94.0 | 91.0 |
| TS-2 | 12 min 40 s | 14 min | 8 min 50 s | 13 min 30 s |
| T-90 | 21 min 35 s | 21 min 40 s | 12 min 45 s | 19 min 20 s |

4) Mechanical properties of the vulanizates:

The measurements are carried out on the optimally cured compositions (temperature: 170° C.; times for each composition: T-90 times indicated in Table V).

The measured properties and the results obtained are given in table VI below:

TABLE VI

| Mechanical properties | | Control 3 | Example 10 | Example 11 | Example 12 |
|---|---|---|---|---|---|
| 100% modulus | (1) | 1.35 | 2.5 | 2.7 | 2.45 |
| 300% modulus | (1) | 4.3 | 9.1 | 9.6 | 9.1 |
| Tensile strength | (1) | 23 | 23.8 | 22.8 | 25.3 |
| % elongation | (1) | 750 | 590 | 520 | 615 |
| Shore A hardness | (3) | 61 | 66 | 67 | 61 |
| Abrasion resistance | (4) | 175 | 131 | 142 | 145 |

(1), (3) and (4): cf. definitions given beneath Table III

When a multifunctionalized POS of formula (I) is used in combination with a processing aid such as, especially, a hydroxylated silicone oil or a coating POS of formula (VI), the following observations may be made: in the uncured mixtures (table V), there is an additional decrease in the viscosity and, in the properties of the vulcanizates (table VI), there is a possible additional improvement in the moduli while maintaining the improvement in the abrasion resistance.

What is claimed is:

1. Process for preparing multifunctionalized polyorganosiloxanes (POSs) comprising alkoxyl polar functional groups and functional groups each having a thiol group SH, which are random, sequentially-polymerized or blocked linear copolymers of the following average formula:

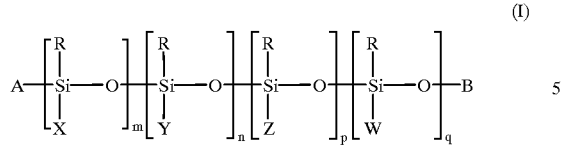

(I)

in which:
- the symbols R, which are identical or different, each represent a linear or branched alkyl radical having from 1 to 6 carbon atoms or a phenyl radical;
- the symbols X, which are identical or different, each represent a linear or branched alkoxyl radical having from 1 to 15 carbon atoms;
- the symbols Y, which are identical or different, each represent a chain R' which includes an ethylenically unsaturated group, said chain being linked to the silicon atom by an Si—C bond where:
  - the chain R' has from 2 to 30 carbon atoms and, optionally, one or more oxygenated heteroatoms,
  - the ethylenically unsaturated group of R' is:
  - either present as a chain termination and of the type:

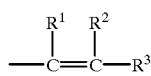

where the symbols $R^1$, $R^2$ and $R^3$, which are identical or different, each represent a hydrogen atom or a linear or branched alkyl radical having from 1 to 3 carbon atoms,
or present in an intermediate position and of the type:

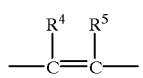

where the symbols $R^4$, $R^5$, which are identical or different, each represent a hydrogen atom or a linear or branched alkyl radical having from 1 to 3 carbon atoms, it being possible for said intermediate position to be on a
cyclic or polycyclic part of the chain R' consisting of one or more rings having from 5 to 12 members;
- the symbols Z, which are identical or different, each represent a chain R" linked to an SH group, said chain being attached to the silicon atom by an Si—C bond, where:
  - the chain R" derives from the above-defined chain R' by the addition of a hydrogen atom and of an SH group respectively on one or the other of the carbon atoms of the ethylenically unsaturated group which are linked to each other by a double bond, the SH group is:
  - either present as a chain termination and of the following type (or types):

(1)

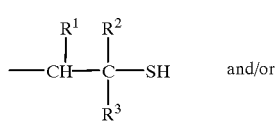 and/or (2)

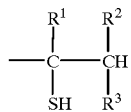

where the symbols $R^1$, $R^2$ and $R^3$ are as defined above, or present in an intermediate position and of the following type (or types):

(3)

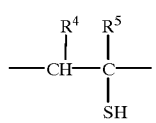 and/or (4)

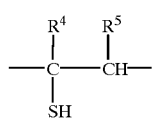

where the symbols $R^4$ and $R^5$ are as defined above, it being possible for said intermediate position to be on a cyclic or polycyclic part of the chain consisting of one or more rings having from 5 to 12 members;
- the symbols W, which are identical or different, each represent a sequence —R"—(S)$_i$—R"—Si≡ where:
  - i is an integer $\geq 1$,
  - the symbol on the right, Si≡, represents a silicon atom belonging to another polyorganosiloxane chain or to the same polyorganosiloxane chain;
- the symbols m, n, p and q each represent integers or fractions, with the additional conditions in which:
  - the sum m+n+p+q lies within the range 2 to 300,
  - m lies within the range 1 to 150,
- the sum n+p+q lies within the range 1 to 150,
- n lies within the range 0 to 85,
- p lies within the range 1 to 100,
- q lies within the range 0 to 25,
- the symbols A and B represent terminal groups which comprise:
  - with respect to A: either radicals (i), (2i) or (3i) taken alone, or mixtures of radicals (i) with radicals (2i) and/or (3i) and/or (4i):

(i)

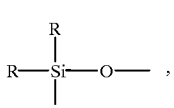

(2i)

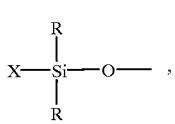

(3i)

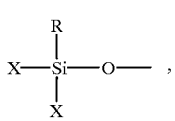

-continued

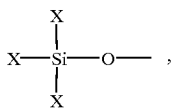
(4i)

with respect to B: either radicals (5i), (6i) or (7i) taken alone, or mixtures of radicals (5i) with radicals (6i) and/or (7i) and/or (8i):

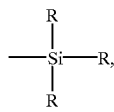
(5i)

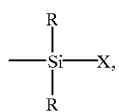
(6i)

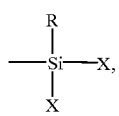
(7i)

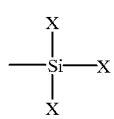
(8i)

where the symbols R and X are as defined above;
said process for preparing the POSs of formula (I) comprising making hydrogen sulphide react on a random, sequentially-polymerized or block linear copolymer, of average formula:

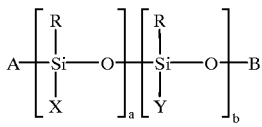
(II)

in which:
the symbols A, B, R, X and Y are defined as above with regard to formula (I); the symbols a and b each represent integers or fractions and can be defined as follows:
a meets the same definition as that of m given above with regard to formula (I),
b=n+p+q; n, p and q and their sum satisfying the definitions given above with regard to formula (I),
the sum a+b meeting the same definition as that of the sum m+n+p+q given above with regard to formula (I);
the reaction of $H_2S$ on the POS (II) being carried out in the presence of a catalyst based on one or more free-radical initiator compounds at a temperature lying within the range from ambient temperature (23° C.) to 150° C.

2. Process according to claim 1, wherein hydrogen sulphide is made to react on a POS of formula (II) in which:
the symbols R represent the radicals: methyl, ethyl, n-propyl, isopropyl, n-butyl;
the symbols X represent linear or branched alkoxyl radicals having from 1 to 6 carbon atoms;
the symbols A and B represent terminal groups which are, respectively, on the one hand either radicals (i), (2i) or (3i) taken alone or mixtures formed from the radicals (i)+[(2i) and/or (3i) and/or (4i)] and on the other hand either radicals (5i), (6i) or (7i) taken alone or mixtures formed from the radicals (5i)+[(6i) and/or (7i) and/or (8i)], where the symbols R and X correspond to the terms defined as above in the two previous paragraphs, the molar composition of the terminal groups being made up as follows:
0 to 100 mol % of all terminal groups comprise $(R)_3Si$ units, which are provided by the radicals of formulae (i) and/or (5i),
0 to 100 mol % of all terminal groups comprise $(R)_2XSi$ units, which are provided by the radicals of formulae (2i) and/or (6i),
0 to 100 mol % of all terminal groups comprise $R(X)_2Si$ units, which are provided by the radicals of formulae (3i) and/or (7i), and
0 to 20 mol % of all terminal groups comprise $(X)_3Si$ units, which are provided by the radicals of formulae (4i) and/or (8i),
the sum of the radicals having in each case to be equal to 100 mol %;
the symbols Y are selected from the group consisting of:

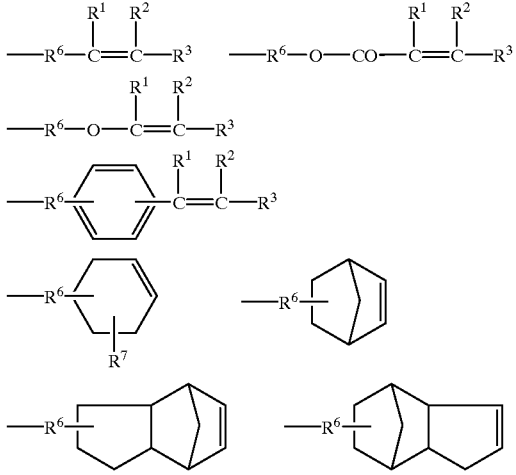

where:
$R^1$, $R^2$ and $R^3$, which are identical or different, each represent a hydrogen atom or a methyl radical;
$R^6$ represents a divalent radical $—(CHR^8)_j—$ with $R^8$ being a hydrogen atom or a methyl group, it being possible for the various $CHR^8$ units to be identical or different, and with j being an integer ranging from 1 to 6;
$R^7$ represents a hydrogen atom or a methyl radical;
the sum a+b lies within the range 10 to 100, a is a number ranging from 1 to 50 and b is a number ranging from 1 to 50.

3. Process according to claim 1, wherein the reaction between $H_2S$ and the POS of formula (II) uses, as catalyst, at least one free-radical initiator compound belonging to the family of azo-organic compounds and organic peroxides.

4. Process according to claim 1, wherein the temperature of the reaction between $H_2S$ and the POS of formula (II) lies within the range 50° C. to 120° C.

5. Process according to claim 1, wherein the reaction between $H_2S$ and the POS of formula (II) is conducted in a closed reactor at a pressure lying within the range $5\times10^5$ to $20\times10^5$ Pa.

6. Process according to claim 1, wherein the reaction between $H_2S$ and the POS of formula (II) is conducted in a homogeneous medium by the addition of a solvent or a mixture of solvent(s) common to the POS (II) and to the catalyst.

7. Process according to claim 6, wherein aprotic non-polar solvents comprising chlorobenzene, toluene, xylene, hexane, cyclohexane, octane and/or decane are used.

8. Multifunctionalized polyorganosiloxanes comprising alkoxyl polar functional groups and functional groups each having a thiol group SH, which are obtained by the process according to claim 1, wherein they are random, sequentially-polymerized or block linear copolymers of the following average formula:

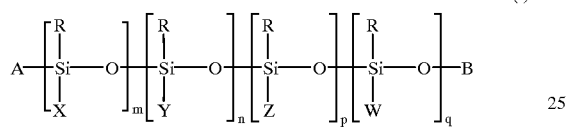

(I)

in which:
the symbols R, which are identical or different, each represent a linear or branched alkyl radical having from 1 to 6 carbon atoms or a phenyl radical;
the symbols X, which are identical or different, each represent a linear or branched alkoxyl radical having from 1 to 15 carbon atoms;
the symbols Y, which are identical or different, each represent a chain R' which includes an ethylenically unsaturated group, said chain being linked to the silicon atom by an Si—C bond where:
the chain R' has from 2 to 30 carbon atoms and, optionally, one or more oxygenated heteroatoms,
the ethylenically unsaturated group of R' is:
either present as a chain termination and of the type:

where the symbols $R^1$, $R^2$ and $R^3$, which are identical or different, each represent a hydrogen atom or a linear or branched alkyl radical having from 1 to 3 carbon atoms,
or present in an intermediate position and of the type:

where the symbols $R^4$, $R^5$, which are identical or different, each represent a hydrogen atom or a linear or branched alkyl radical having from 1 to 3 carbon atoms, it being possible for said intermediate position to be on a cyclic or polycyclic part of the chain R' consisting of one or more rings having from 5 to 12 members;
the symbols Z, which are identical or different, each represent a chain R" linked to an SH group, said chain being attached to the silicon atom by an Si—C bond, where:

the chain R" derives from the above-defined chain R' by the addition of a hydrogen atom and of an SH group respectively on one or the other of the carbon atoms of the ethylenically unsaturated group which are linked to each other by a double bond, the SH group is:
either present as a chain termination and of the following type (or types):

(1)

and/or

(2)

where the symbols $R^1$, $R^2$ and $R^3$ are as defined above, or present in an intermediate position and of the following type (or types):

(3)

and/or

(4)

where the symbols $R^4$ and $R^5$ are as defined above, it being possible for said intermediate position to be on a cyclic or polycyclic part of the chain consisting of one or more rings having from 5 to 12 members;
the symbols W, which are identical or different, each represent a sequence —R"—(S)$_j$—R"—Si≡ where:
i is an integer $\geq 1$,
the symbol on the right, Si≡, represents a silicon atom belonging to another polyorganosiloxane chain or to the same polyorganosiloxane chain;
the symbols m, n, p and q each represent integers or fractions, with the additional conditions in which:
the sum m+n+p+q lies within the range 2 to 300,
m lies within the range 1 to 150,
the sum n+p+q lies within the range 1 to 150,
n lies within the range 0 to 85,
p lies within the range 1 to 100,
q lies within the range 0 to 25, and furthermore:
either the symbol n is a number equal to zero and the symbol q then represents a number different from zero,
or the symbol n represents a number different from zero and the symbol q then represents a number which is equal to zero or different from zero,
the symbols A and B represent terminal groups which comprise:
with respect to A: either radicals (i), (2i) or (3i) taken alone, or mixtures of radicals (i) with radicals (2i) and/or (3i) and/or (4i):

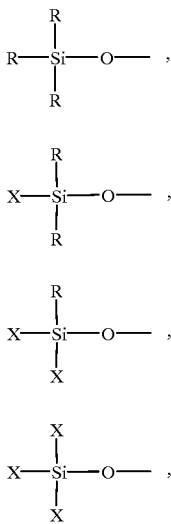

with respect to B: either radicals (5i), (6i) or (7i) taken alone, or mixtures of radicals (5i) with radicals (6i) and/or (7i) and/or (8i):

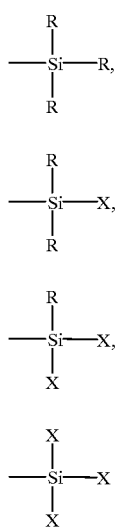

where the symbols R and X are as defined above.

9. An anti-blocking modulator for a silicone composition comprising an effective amount of at least one multifunctionalized POS of formula (I) obtained by the process according to claim 1.

10. A method for aiding the processing of a white filler in filled silicone compositions and of allowing the silicone products obtained to be reinforced, said method comprising using an effective amount of at least one multifunctionalized POS of formula (I) obtained by the process according to claim 1 as a coating agent for said white filler.

11. The method according to claim 10, wherein the POSs of formula (I) have identical or different symbols Z, each representing a chain R" linked to an SH group of secondary nature.

12. Compositions of one or more elastomers containing a reinforcing white filler and obtained by using an effective amount of at least one multifunctionalized POS of formula (I) prepared by the process according to claim 1.

13. Compositions according to claim 2, wherein the POSs comprise the POSs of formula (I) selected from those obtained by the process defined above in claim 2, which have identical or different symbols Z, each representing a chain R" linked to an SH group of secondary nature.

14. Compositions according to claim 12, which comprise (the parts are given by weight):
per 100 parts of elastomer(s),
100 parts of reinforcing white filler and
15 parts of POS per 100 parts of reinforcing white filler.

15. Compositions according to claim 12, wherein the white filler comprises silica, alumina or a mixture of these two species.

16. Composition according to claim 15, wherein:
the silica is a conventional or highly dispersible precipitated silica having a BET specific surface area $\leq 450$ m$^2$/g;
the alumina is a highly dispersible alumina having a BET specific surface area of between 30 and 400 m$^2$/g and a high degree of Al—OH surface reactive functional groups.

17. Compositions according to claim 12, wherein the elastomer(s) employed is (are) chosen from:
(1) homopolymers obtained by polymerization of a conjugated diene monomer having from 4 to 22 carbon atoms;
(2) copolymers obtained by copolymerization of one or more of the aforementioned conjugated dienes amongst themselves or with one or more ethylenically unsaturated monomers comprising:
aromatic vinyl monomers having from 8 to 20 carbon atoms;
vinyl nitryl monomers having from 3 to 12 carbon atoms;
acrylic ester monomers derived from acrylic acid or from methacrylic acid with alkanols having from 1 to 12 carbon atoms;
(3) copolymers obtained by copolymerization of ethylene with an α-olefin having from 3 to 6 carbon atoms;
(4) ternary copolymers obtained by copolymerization of ethylene and of an α-olefin having from 3 to 6 carbon atoms with a nonconjugated diene monomer having from 6 to 12 carbon atoms;
(5) natural rubber;
(6) copolymers obtained by copolymerization of isobutene and of isoprene (butyl rubber) or halogenated versions thereof;
(7) a mixture of several of the aforementioned elastomers (1) to (6) amongst themselves;
(8) chlorosulphonated polyethylenes;
(9) fluorinated hydrocarbons; and
(10) elastomers of the epichlorohydrin-ethylene oxide or polyepichlorohydrin type.

18. Compositions according to claim 17, comprising one or more elastomers selected from the group consisting of: polybutadiene, polychloroprene, polyisoprene, poly(styrene-butadiene), poly(acrylonitrile-butadiene) in hydrogenated or non-hydrogenated form, poly(styrene-butadiene-isoprene), an (ethylene-propylene-nonconjugated diene monomer) terpolymer, natural rubber and butyl rubber.

19. Compositions according to claim 12, futher comprising all or some of the other constituents and auxiliary additives normally used in the field of elastomer and rubber compositions.

20. Compositions according to claim 19, further comprising a processing aid selected from the group formed by:

1) an α,ω-(dihydroxy)polydiorganosiloxane oil of formula:

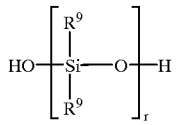
(III)

where: r has a value sufficient to give the oil a dynamic viscosity at 25° C. of between 5 and 1000 mPa.s and the organic radicals $R^9$ are methyl, ethyl, propyl and/or phenyl radicals;

2) a polyalkylene glycol of formula:

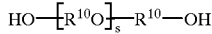
(IV)

where: s has a value sufficient to give the compound of formula (IV) a number-average molecular mass of between 100 and 30,000 and the radicals $R^{10}$, which are identical or different, each represent a linear or branched alkylene radical having from 1 to 4 carbon atoms;

3) a hydrolysable silane of formula

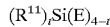
(V)

where: the symbols $R^{11}$ each represent a $C_1$–$C_8$ linear or branched alkyl radical, a $C_5$–$C_8$ cycloalkyl radical, a $C_6$–$C_{12}$ aryl radical or an aralkyl radical having a $C_6$–$C_{12}$ aryl substituent and a $C_1$–$C_4$ alkyl substituent; the symbols E are hydrolysable groups and each represent a $C_1$–$C_{10}$ alkoxy group, a $C_6$–$C_{12}$ aryloxy group, a $C_1$–$C_{13}$ acyloxy group or a $C_1$–$C_8$ ketiminoxy group;

4) a coating polyorganosiloxane comprising a POS of formula (II) satisfying the definitions given above in claim 1 in the legend for formula (II), or in a similar POS of formula:

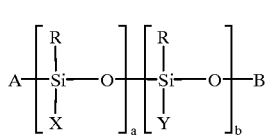
(VI)

in which: the symbols A, B, R, X, a and b satisfy the definitions given above in claim 1 in the legend for formula (II); and the symbols Y', which are identical or different, each represent a $C_7$–$C_{30}$ linear or branched alkyl group; and 5) a mixture of at least two of the aforementioned agents 1) to 4).

21. Articles made of elastomer(s), having a body comprising a composition according to claim 12.

22. Articles according to claim 21, used in engine mounts, vehicle track components, shoe soles, cableway rollers, seals for domestic electrical appliances, and cable sheaths.

* * * * *